United States Patent [19]
Fung

[11] Patent Number: 6,079,025
[45] Date of Patent: Jun. 20, 2000

[54] SYSTEM AND METHOD OF COMPUTER OPERATING MODE CONTROL FOR POWER CONSUMPTION REDUCTION

[75] Inventor: Henry Tat-Sang Fung, San Jose, Calif.

[73] Assignee: Vadem, San Jose, Calif.

[21] Appl. No.: 09/121,352

[22] Filed: Jul. 23, 1998

Related U.S. Application Data

[62] Division of application No. 08/767,821, Dec. 17, 1996, Pat. No. 5,892,959, which is a continuation of application No. 08/460,191, Jun. 2, 1995, abandoned, which is a continuation of application No. 08/285,169, Aug. 3, 1994, abandoned, which is a continuation of application No. 08/017,975, Feb. 12, 1993, Pat. No. 5,396,635, which is a continuation of application No. 07/908,533, Jun. 29, 1992, abandoned, which is a continuation of application No. 07/532,314, Jun. 1, 1990, abandoned.

[51] Int. Cl.$^7$ .................................................. G06F 1/26
[52] U.S. Cl. .................................... 713/323; 713/320
[58] Field of Search ...................... 713/300–340

[56] References Cited

U.S. PATENT DOCUMENTS

| | | | |
|---|---|---|---|
| 4,279,020 | 7/1981 | Christian et al. | 364/900 |
| 4,316,247 | 2/1982 | Iwamoto | 364/200 |
| 4,317,180 | 2/1982 | Lies | 364/707 |
| 4,365,290 | 12/1982 | Nelms et al. | 364/200 |
| 4,381,552 | 4/1983 | Nocilini et al. | 364/900 |
| 4,398,192 | 8/1983 | Moore et al. | 340/825.44 |
| 4,463,440 | 7/1984 | Nishiura et al. | 364/900 |
| 4,479,191 | 10/1984 | Nojima et al. | 364/707 |
| 4,509,148 | 4/1985 | Asano et al. | 365/230 |
| 4,510,398 | 4/1985 | Culp et al. | 307/35 |
| 4,538,231 | 8/1985 | Abe et al. | 364/483 |
| 4,545,030 | 10/1985 | Kitchin | 364/900 |
| 4,667,289 | 5/1987 | Yoshida et al. | 364/200 |
| 4,698,748 | 10/1987 | Juzswik et al. | 364/200 |
| 4,766,567 | 8/1988 | Kato | 364/900 |
| 4,780,843 | 10/1988 | Tietjen | 364/900 |
| 4,809,163 | 2/1989 | Hirosawa et al. | 364/200 |
| 4,823,292 | 4/1989 | Hillion | 364/707 |
| 4,835,681 | 5/1989 | Culley | 364/200 |
| 4,841,440 | 6/1989 | Yonezu et al. | 364/200 |
| 4,881,205 | 11/1989 | Aihara | 365/222 |
| 4,907,183 | 3/1990 | Tanaka | 364/707 |
| 4,922,450 | 5/1990 | Rose et al. | 364/900 |
| 4,963,769 | 10/1990 | Hiltpold et al. | 307/465 |
| 4,968,900 | 11/1990 | Harvey et al. | 307/296.3 |
| 4,974,180 | 11/1990 | Patton et al. | 364/550 |
| 4,980,836 | 12/1990 | Carter et al. | 364/483 |
| 4,991,129 | 2/1991 | Swartz | 364/707 |
| 4,996,706 | 2/1991 | Cho | 379/93 |

(List continued on next page.)

*Primary Examiner*—Ayaz R. Sheikh
*Assistant Examiner*—David A. Wiley
*Attorney, Agent, or Firm*—Flehr Hohbach Test Albritton & Herbert LLP

[57] ABSTRACT

An activity sensing power reduction and conservation apparatus, system, and method for a computer system. The computer system has resources including a processor, a memory, and an input/output device, and an operating system for controlling the resources. At least one of the resources can be placed into in any one of three operating modes including a first mode having a first power consumption level, a second mode having a second power consumption level less than the first level, and a third mode having a third level less than the second level. The first mode may be characterized by maintaining clocking of the processor at a first clock frequency, the second mode by clocking the processor at a second clock frequency less than the first frequency or by not maintaining clocking of the processor, and the third mode by maintaining operation of the memory to preserve the integrity of any stored memory contents. During operation of the computer system in the first mode, activity is monitored to detect completion of idle threads executing on the system, and the processor clock is slowed or stopped to at least that one resource in response to the idle thread completion detection. During operation in the second mode where the processor clock is slowed or stopped, a slow or stop resource command is generated to slow or turn off clock signal to at least one of the resources in response to occurrence of a timeout condition indication received from a timer circuit.

48 Claims, 5 Drawing Sheets

U.S. PATENT DOCUMENTS

| | | | |
|---|---|---|---|
| 5,021,679 | 6/1991 | Fairbanks et al. | 307/66 |
| 5,025,387 | 6/1991 | Frane | 364/493 |
| 5,041,964 | 8/1991 | Cole et al. | 364/200 |
| 5,083,266 | 1/1992 | Watanabe | 395/275 |
| 5,119,377 | 6/1992 | Cobb et al. | 371/550 |
| 5,123,107 | 6/1992 | Mensch, Jr. | 395/800 |
| 5,129,091 | 7/1992 | Yorimoto et al. | 395/750 |
| 5,151,992 | 9/1992 | Nagae | 395/750 |
| 5,167,024 | 11/1992 | Smith et al. | 395/375 |
| 5,175,845 | 12/1992 | Little | 395/550 |
| 5,201,059 | 4/1993 | Nguyen | 395/800 |
| 5,218,704 | 6/1993 | Watts, Jr. et al. | 395/750 |
| 5,222,239 | 6/1993 | Rosch | 395/750 |
| 5,239,652 | 8/1993 | Secbert et al. | 395/750 |
| 5,247,164 | 9/1993 | Takahashi | 235/492 |
| 5,247,213 | 9/1993 | Trinh et al. | 307/465 |
| 5,247,655 | 9/1993 | Khan et al. | 395/550 |
| 5,249,298 | 9/1993 | Bolan et al. | 395/750 |
| 5,251,320 | 10/1993 | Kuzawinski et al. | 395/750 |

SYSTEM AND METHOD OF COMPUTER OPERATING MODE CONTROL FOR POWER CONSUMPTION REDUCTION

CROSS REFERENCE RELATED U.S. PATENT APPLICATION

This application is a divisional of Ser. No. 08/767,821 Dec. 17, 1996 U.S. Pat. No. 5,892,959 which is a continuation of Ser. No. 08/460,191 Jun. 2, 1995 abandoned, which is a continuation of Ser. No. 08/285,169 Aug. 3, 1994 abandoned which is a continuation of Ser. No. 08/017,975 Feb. 12, 1993 U.S. Pat. No. 5,396,635 which is a continuation of Ser. No. 07/908,533 Jun. 29, 1992 abandoned which is a continuation of Ser. No. 07/532,314 Jun. 1, 1990 abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to computers and particularly to methods and apparatus for power management in computers, particularly in battery-powered computers.

The major parts of computers include a central processing unit (CPU), input/output (I/O) devices such as display screens, keyboards, modems, printers, disk drives and the like, and storage (memory).

The CPU communicates with the I/O devices, with the storage and otherwise operates with addresses defined within the computer address range. Typically, addresses for I/O devices are within an I/O address range. Addresses for execution of programs without I/O reference typically are within a memory address range. Similarly, that portion of memory allocated for display is within a video memory address range.

Computers function to execute application programs such as word processing, spreadsheet and data base management programs. Typically, the computer and the application programs are under the control of a software operating system that manages the different system parts and resources including some I/O devices. For example, during the execution of an application program when the CPU wishes to check to determine if any key has been depressed on the keyboard, the CPU through a subroutine call to the operating system requests the operating system through execution of a subroutine to perform a key-actuation detection task. Since the operating system performs many such tasks, the operating system has a detailed knowledge of many activities within the computer. However, under some circumstances, application programs bypass the operating system and directly address I/O devices. Typically, each I/O device is assigned an I/O address within an I/O address range. For application programs which directly address I/O devices without operating system calls, the operating system is not immediately aware of I/O activity. With such complex operation in computers, the task of power conservation is difficult.

The need for power conservation is well known in battery-powered computers and must be performed in a manner that does not interfere with the operation of the computer or impede users from interacting with the computer during the execution of application programs.

Conservation of power has been utilized for some parts of battery-powered computers but has been ignored for other parts of such computers. In general, power consumption is distributed in battery-powered computers among the major parts of those computers. One part with significant power consumption is the central processing unit (CPU). Another part is the input/output (I/O) devices such as display screens, keyboards, modems, printers, disk drives and the like. Still another part with significant power consumption is storage (memory).

Prior art attempts at conserving power have employed screen blanking which reduces the power to the display screen when the screen has not been used for some period of time. Typically, a timeout circuit senses changes in screen information and, if no change has occurred for a predetermined timeout period, the backlight to the screen is turned off for power reduction. While screen blanking is effective in reducing power for the display screen, no reduction results in power to the driver circuitry for the display, to the CPU, or to other parts of the computer. Furthermore, when the screen is blanked, the computer cannot be used until reset.

Other prior art attempts at conserving power consumption have focused on disk drives because the power consumption of rotating magnetic disks is high. Disk drive manufacturers have employed various schemes for reducing the power consumption of the disk drive. While such power consumption schemes are effective for the disk drive, no reduction results in power to the CPU or other parts of the computer. Computers without disk drives, such as small "notebook" computers, have no need, of course, for the conservation of power in a disk drive.

In order to extend the battery life of portable computers and to manage power in computers, there is a need for improved power management methods and apparatus in computers, particularly for power management that can be extended to many different parts and conditions of the computer.

SUMMARY OF THE INVENTION

The present invention is a method and apparatus for power management in a computer. The computer typically includes as hardware a central processing unit (CPU), storage (memory) and I/O devices and includes as software an operating system adapted to control the computer during application program execution.

The power management method and apparatus causes the computer system to enter the power conservation mode after sensing inactivity by a software monitor or by a hardware monitor.

The software monitor monitors the activity of the operating system or other software in the system. The software monitor typically is a software module linked, for example, to the operating system at boot time for monitoring subroutine calls to the operating system.

The hardware monitor monitors the hardware to detect inactivity. The hardware monitor typically is circuitry for detecting inactivity independently from the software. For example, the hardware monitor senses predetermined address ranges, such as an I/O address range and a video memory address range, and monitors the activity of addresses by the CPU to addresses within these ranges. If no data transfers occur within the specified address ranges for predetermined periods of time, then a power conservation mode is entered to conserve power in the computer system.

By using both a software monitor and a hardware monitor, the power management unit determines exactly when to enter into power conservation mode without sacrificing system performance.

In the software monitor, inactivity is determined by detecting how many "active" or "idle" function calls an application makes within some time period. In the IBM PC DOS environment, the activity status is checked, for example, no less frequently than every 50 milliseconds. There are 256 IBM PC DOS function calls and, in principle, each is labeled as "idle" or "active" and each is assigned a corresponding positive or negative number. A positive number is assigned to an "active" function call and a negative number to an "idle" function call.

The power management software monitor forms an activity measurement as a running total of the function call numbers as the function calls are made. Whenever a function call is made (either active or conservation), the power management software monitor algebraically adds the function call number to the accumulated value and determines whether the system is to remain in the active mode or be switched to the conservation mode by comparing the magnitude of the accumulated value with a function call threshold.

The function call threshold for determining activity is a variable depending on the computer system speed. To prevent the system from oscillating between the active and conservation mode due to minor changes in system activity, hysteresis is provided by using active and conservation function call thresholds. The accumulated total for the activity measurement is reset after it reaches the active threshold going in one direction or the conservation threshold going in the opposite direction as the case may be.

The active and conservation thresholds are typically unequal so that the entry and exit from conservation mode is biased. For example, in order to have the system enter the conservation mode quickly and thereby to reduce power consumption, the active threshold is set with a number greater than the number for the conservation threshold.

In one embodiment, functions that require immediate attention are assigned numbers large relative to the active and idle thresholds so that a single occurrence of the function call will force the accumulated count over the active threshold and thus force the system to be in the active mode. The hysteresis effect can be bypassed by forcing the power management unit into active mode without changing the activity count. In this case, the next idle function call will bring the system back to idle mode.

If the software monitor or the hardware monitor indicates inactivity, the power management unit enters the conservation mode. The conservation mode has multiple states which provide different levels of power conservation.

A first state, called a DOZE state, is entered after sensing inactivity by the hardware monitor for a first period of time. A second state, called a SLEEP state, is entered after sensing inactivity by the hardware monitor for a second predetermined time where the second predetermined time is greater than the first predetermined time. A third state, called a SUSPEND state, is entered after sensing inactivity by the hardware monitor for a third period of time greater than the first and second time periods.

Another state is OFF which turns off all power for the computer under predetermined conditions.

During periods of inactivity, power consumption is reduced in different ways, for example, by reducing clock speeds or removing clocks, and/or by removing power, and/or by controlling the refresh frequency to memory.

In accordance with the above summary, the present invention achieves the objective of providing an improved power management method and apparatus.

The foregoing and other objects, features and advantages of the invention will be apparent from the following detailed description in conjunction with the drawings.

DESCRIPTION OF THE PREFERRED EMBODIMENTS

Figure 1:
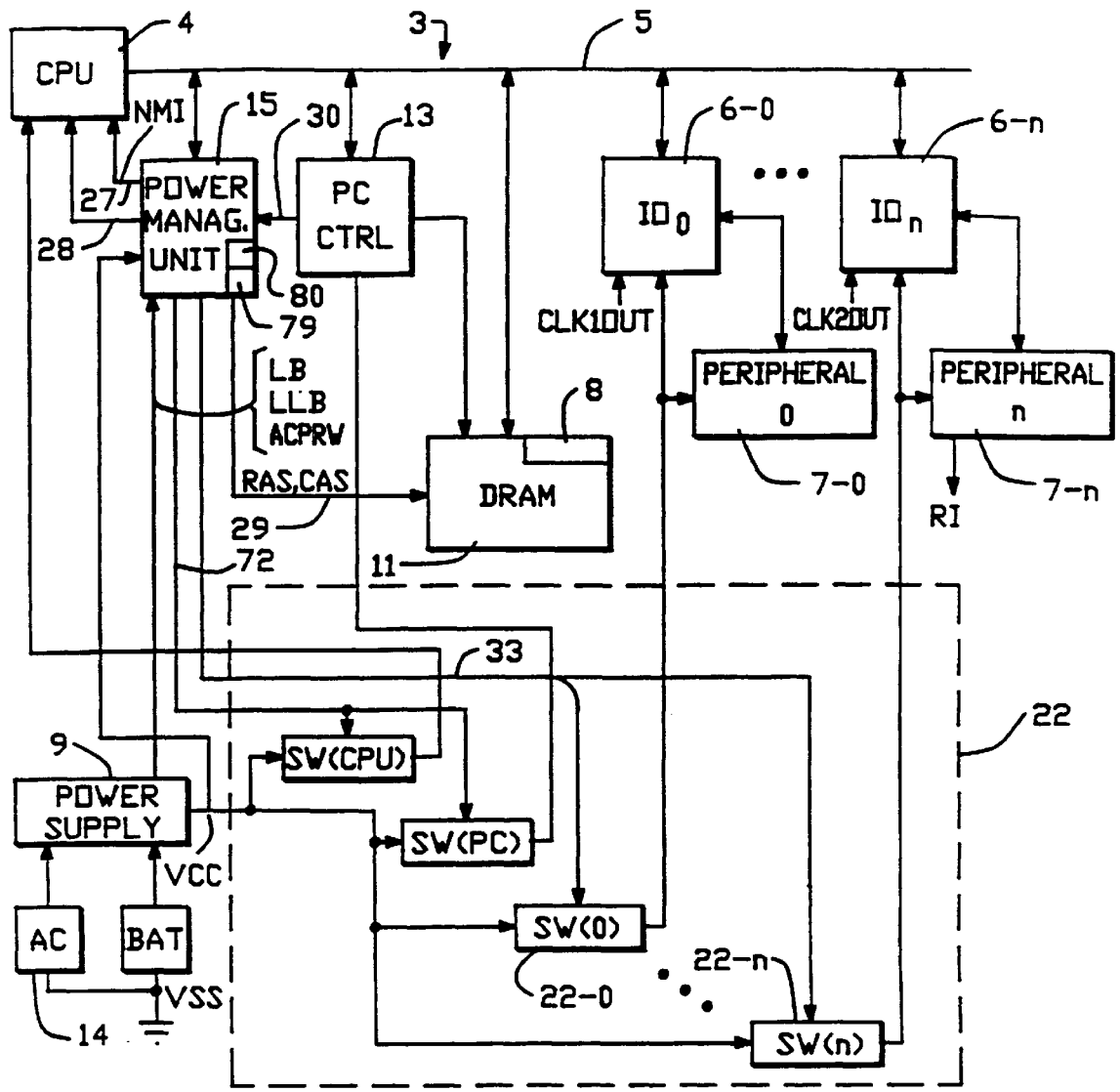
FIG. 1 depicts a block diagram of a computer with the power management unit of the present invention.

Computer System—FIG. 1

In FIG. 1, computer 3 is typically a small, battery-powered computer such as a "notebook" computer. The computer 3 includes a CPU 4, a CPU bus 5, a plurality of I/O controllers 6-0, . . . , 6-n where "n" is a constant equal, for example, to 7. Connected to the controllers 6-0 through 6-n are plurality of peripheral devices 7-0, . . . , 7-n, respectively. The controllers and peripheral devices 6 and 7 typically include a keyboard, a display, a hard disk drive, a modem, a printer, and similar devices. Each of the controllers 6-0 through 6-n connects to the conventional computer bus 5.

Also connected to the bus 5 is the memory, which in one particular embodiment is DRAM random access memory 11. The memory 11, when of the type requiring refresh, is refreshed with *RAS and *CAS lines 29 under control of the PC controller 13 which provides *PCRAS and *PCCAS signals on lines 30 to power management unit 15 including a hardware monitor 79 and a software monitor 80. The I/O devices are separately powered through switch unit 22 and switches 22-0, . . . , 22-n by the VCC power from power supply 9 which receives power either from the battery 10 or an AC source 14. Power supply 9 is of a conventional type which supplies a low battery signal LB, a low-low battery signal LLB, and an AC power signal ACPWR to power management unit 15.

The computer 3 typically includes as software an operating system adapted to control the computer system and to control operations during application program execution. Computer 3 functions to execute application programs such as word processing, spreadsheet and data base management programs. Computer 3, during the execution of application programs, is under control of a software operating system. The operating system manages the different system parts and resources including the I/O devices 6 and 7. For example, during the execution of an application program when the CPU wishes to check to determine if any key has been depressed on a keyboard I/O device, the CPU 4 through a subroutine call to the operating system requests the operating system to execute a subroutine to perform a key-actuation detection task. Since the operating system performs many similar calls to the operating system, these calls represent detailed information about many activities within the computer system.

In FIG. 1, the computer 3, through the CPU 4, issues control and address signals on the bus 5 which define the overall computer address range for computers including the sets of address ranges for all of the memory, I/O and other devices connected to the bus 5. Whenever any of the peripherals 7-0 to 7-n are to be accessed for data to be transferred over the bus 5, the address of the corresponding I/O controller 6-0 to 6-n (either by unique address lines or unique address lines in combination with control lines) specifies the addressed one of the I/O controllers 6 and corresponding peripheral 7.

Similarly, memory 11 has locations addressed by a set of addresses on bus 5 within a memory address range. Some of the addresses in the range of addresses for memory 11 are typically allocated and reserved only as a set of video memory addresses. Whenever the video memory region 8 of memory 11 is to be addressed, address appears on bus 5 within the set of video memory addresses.

The computer system of FIG. 1 includes a power management unit 15 having a software monitor 80 and a hardware monitor 79 for monitoring activity of the computer system. The power management unit 15 is connected to the bus 5 to sense activity, using hardware monitor 79, on the bus 5 and is connected to the CPU 4 (executing the operating system and the software monitor 80), the power supply 9, the memory 11 and PC controller 13 for controlling power management.

The power management unit 15 of FIG. 1 operates to cause the computer system to enter the power conservation mode after sensing inactivity by the hardware monitor 79 or by the software monitor 80 and to enter the active mode after sensing activity or other conditions.

The hardware monitor 79 monitors the hardware to detect inactivity. The hardware monitor 79 typically is circuitry for detecting inactivity independently from the software and the software monitor 80. For example, the hardware monitor 79 senses predetermined address ranges, such as an I/O address range and a video memory address range, and monitors the activity of addresses by the CPU to addresses within these ranges. If no data transfers occur within the specified address ranges for predetermined periods of time, then a power control mode is entered to conserve power in the computer system.

The software monitor 80 monitors the activity of the operating system or other software in the system. The software monitor 80 typically is a software module linked, for example, to the operating system at boot time for monitoring subroutine calls to the operating system.

By using a software monitor 80 and a hardware monitor 79, the power management unit 15 decides exactly when to enter into power conservation mode and active mode without unnecessarily sacrificing system performance.

The power conservation mode includes a number of activity states. A first state, called a DOZE state, is entered after sensing inactivity for a first period of time by the hardware monitor or when an idle threshold is exceeded as determined by the software monitor. A second state, called a SLEEP state, is entered after sensing inactivity by the hardware monitor for a second predetermined time where the second predetermined time is greater than the first predetermined time or when the activity measurement sensed by the software monitor exceeds the idle threshold. A third state, called a SUSPEND state, is entered after sensing inactivity for a third period of time greater than the first and second time periods. Another state is OFF which turns off all power for the computer under predetermined conditions.

After having entered one or more of the activity states of the conservation mode, the power management unit switches back to the active mode when activity is sensed by the monitors.

Figure 2:
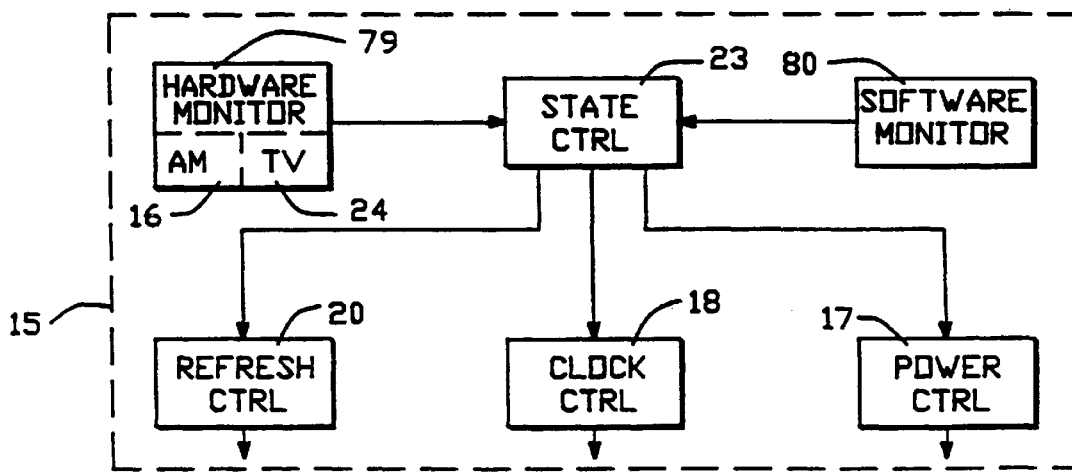
FIG. 2 depicts a block diagram of the power management unit of the FIG. 1 system.

Power Management Unit—FIG. 2

In FIG. 2, a block diagram of the power management unit 15 of FIG. 1 is shown. The power management unit includes a hardware monitor 79 (including an activity monitor 16 and a timer unit 24), a software monitor 80, a state control unit 23, a power control unit 17, a clock control unit 18, and a refresh control unit 20. The hardware monitor 79 (using activity monitor 16) analyzes the address activity on the system bus 5 to provide activity information used to control power management. The timer unit 24 times the activity information sensed by the monitor 16. The state control unit 23 controls the changes among different power consumption states to achieve power management.

The power control unit 17 controls the switches 22-0, . . . , 22-n of FIG. 1 as a function-of the activity sensed by activity monitor 16 and the state determined by state control unit 23.

The clock control unit 18 controls the distribution of and/or the frequency of the CPU and other clocks as a function of the activity sensed by the activity monitor 16 and the state determined by state control unit 23.

The refresh control unit 20 controls the refresh of the RAM memory 11 of FIG. 1 at a rate which is determined by the activity sensed by the activity monitor 16 and state control unit 23.

The power management unit (PMU) 15 is provided to manage power and reduce, over time, the overall power consumption of computer 3. This management is accomplished using an activity monitor 16 to detect periods of system inactivity. During periods of inactivity, power consumption is reduced by reducing clock speeds or removing clocks through clock control unit 18, and/or by removing power through power control unit 17, and/or by controlling the refresh frequency through refresh control unit 20. Standard and slow refresh DRAM support is provided by refresh control unit 20. Inputs are provided to the power management unit 15 which will allow power on or off commands from external sources such as a pushbutton, modem ring indicator, or read-time-clock (RTC) time of day alarm.

Figure 3:
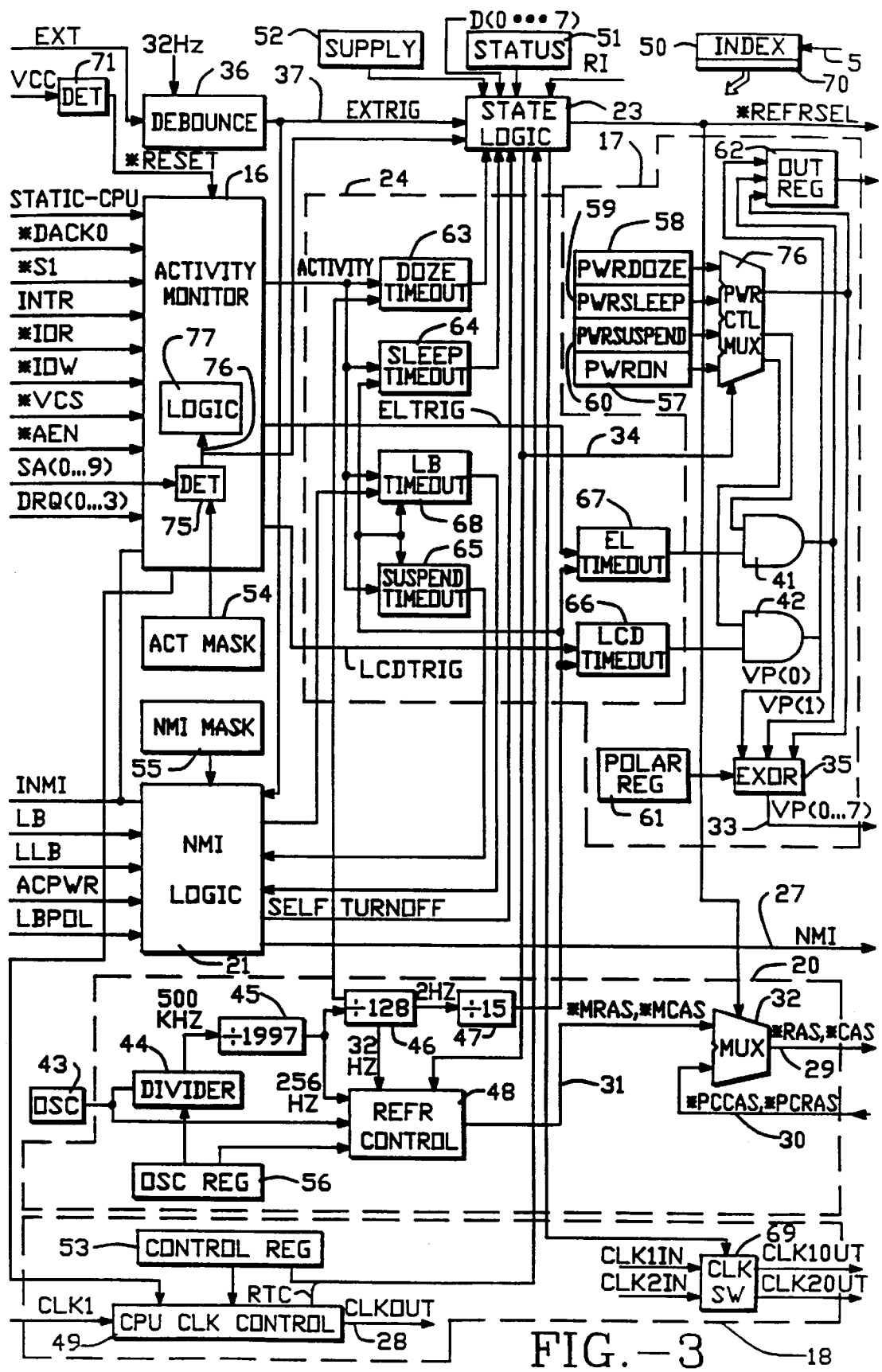
FIG. 3 depicts a detailed block diagram of the hardware for the power management unit of FIG. 2.

Hardware Monitor Generally—FIG. 3

Referring to FIG. 3, the power management unit (PMU) 15 includes the hardware monitor 79 (activity monitor 16 and timer unit 24) which is designed to operate with minimal system requirements and without software support. Power management occurs in response to the hardware monitor independently of any operating system (DOS) or application program support.

In FIG. 3, the PMU 15 has its own power-on reset signal (*RESET) which is produced by a VCC power detector 71, separate from any other reset signal of computer 3, and upon initial power-on, the registers of the power management unit 15 are initialized to preestablished default values to provide basic functionality without need of any software.

While the hardware monitor 79 and the power management unit 15 are provided FIG. 3 as a hardware embodiment, a software embodiment of the hardware monitor 79 is described in the program listing of TABLE 1. Using the program listing of TABLE 1 executing in the CPU 4, power management, using a software embodiment of a hardware monitor, occurs under program control.

In accordance with the operation of the hardware monitor 79, a predetermined set of address ranges on bus 5 is monitored by power management unit 15 as part of the power management operation. For example, the predetermined set of address ranges monitored for power management typically includes all of the I/O address range, that is, the addresses of the I/O controllers 6-0 through 6-n and the video memory address range for the video memory locations 8 within the memory 11. Of course, other address ranges can be added to or used as the predetermined set for power management. The set of address ranges including the video memory and the I/O address ranges has been found to provide excellent information for controlling power management.

The hardware monitor 79 senses the activity of addresses on the bus 5. Whenever addresses within the predetermined set of addresses are not present on the bus 5 for predetermined time periods, the power management unit 15 responsively switches power consumption states and controls the consumption of power by different parts of the computer 3.

The power management unit 15 has four main operating states, namely, ON, DOZE, SLEEP, and SUSPEND, and a fifth state which is OFF. The five power management states, under control of the hardware monitor 79, are shown by the state diagram of FIG. 4. The activity monitor 16, external inputs (EXT, RESET), and the timeouts of timer unit 24 generally control the transitions between states in the state control unit 23 as shown in the state diagram of FIG. 4. The CPU 4 of FIG. 1 may also command the PMU 15 to enter any state. The commands from the CPU 4 typically derive from execution of the software monitor 80, but may derive from other CPU 4 commands.

In FIG. 3, each of the four active states (not OFF) has an associated PWR register which indicates in one embodiment which of eight power control outputs VP[0 . . . 7] on lines 33 will be active during the state. More generally, any number, (n+1), outputs VP[0 . . . n] can be employed. The PWR registers in power control unit 17 are PWRON register 57, PWRDOZE register 58, PWRSLEEP register 59 and PWRSUSPEND register 60 as shown in FIG. 3. A power control multiplexer 76 selects the eight outputs from one of the registers 57 through 60 corresponding to the current state on STATE lines 34 from unit 23, and these eight outputs drive the VP[0 . . . 7] power control outputs from EXOR unit 35. Also, the CPU 4 of FIG. 1 can write, under program control, to any of the PWR registers 57 through 60 to control which of the I/O devices 6 and 7 are powered at any time.

To turn an I/O device on, the corresponding bits in the PWR registers 57 through 60 for the state(s) in which they are to be on is typically high. The POLARITY register 61 specifies the actual polarity of each output VP[0 . . . 7] required to turn the associated one of the switches 22-0, . . . , 22-n on and thereby supply power to the I/O devices 6 and 7. The default value of the POLARITY register is 03h, which implies a logic low to turn on VP[2 . . . 7], which will typically control logic switches 22 with low-true output enables (for example, switches 22 typically include a PNP transistor in the VCC line from power supply 9) and high to turn on the LCD, VP[0], and EL backlight, VP[1], power. The value of the VP[0 . . . 7] bits just prior to the polarity control by EXOR 35 may be read back through the OUTPUT register 62 to CPU 4 over bus 5.

The system clock oscillator signal CLKI is connected to the CPU Clock Control block 49 to produce the CLKOUT. From there CLKOUT, as controlled by PMU 15 and control block 49, drives CPU 4. The CLKOUT clock can be stopped for static CPU's, or reduced automatically by a divisor specified in the CLOCK field of control register 53 during DOZE and SLEEP states. CLKI is passed through unchanged to CLKOUT in SUSPEND state.

Detailed implementations of the various monitor, control and logic blocks of FIG. 3 will be clear from the following detailed description. Additionally, a software embodiment of the hardware monitor 79 including logic and control functions equivalent to those in the hardware embodiment appears as the Program Listing of TABLE 1.

Software Monitor Generally

The software monitor 80 of FIG. 2 includes a power management software module linked into the operating system, for example, during boot up time. One embodiment of the module appears as the program listing of TABLE 2.

The software monitor 80 monitors all the function calls to the operating system. Every time an idle function call is made, the activity measurement, AC(t), is incremented and then checked against thresholds. The incrementing is algebraic by the amount of $D_a$, a positive DOS call number, or $D_i$, a negative DOS call number.

If the activity measurement, AC(t), is below the idle threshold, $T_H$, and the system is in the active mode, no action will be taken. However, if the activity measurement, AC(t), is above the idle threshold, $T_H$, the power management software will check the current system status and if in the active mode, will switch to the conservation mode.

The activity measurement, AC(t), is given by the following Eq. (1):

$$\sum_{a,i} [D_a(t) + D_i(t) = AC(t)] \qquad \text{Eq. (1)}$$

where, $D_a(t)$=Active DOS call numbers as a function of time
$D_i(t)$=Idle DOS call numbers as a function of time
AC(t)=Accumulated Activity Count of DOS call numbers as a function of time, that is, activity measurement While all of the interrupts of the operating system may be assigned a $D_a$ or $D_i$ value the following, for example in the following CHART 1.

| CHART 1 | | |
|---|---|---|
| INTERRUPT | CALL NUMBER | TYPE |
| I16 (keyboard poll) | +12 | Di |
| I10 (video active) | −25 | Da |
| I8 (timer) | −25 | Da |
| I14 (communications) | −400 | Da |

Using the values in CHART 1, each time an interrupt 16 (I16) occurs, the software monitor increments AC(t) by +12 and each time I10 or I8 occurs the software monitor increments AC(t) by −25. The value of AC(t) is shown for one example of operation in FIG. 5.

Figure 5:
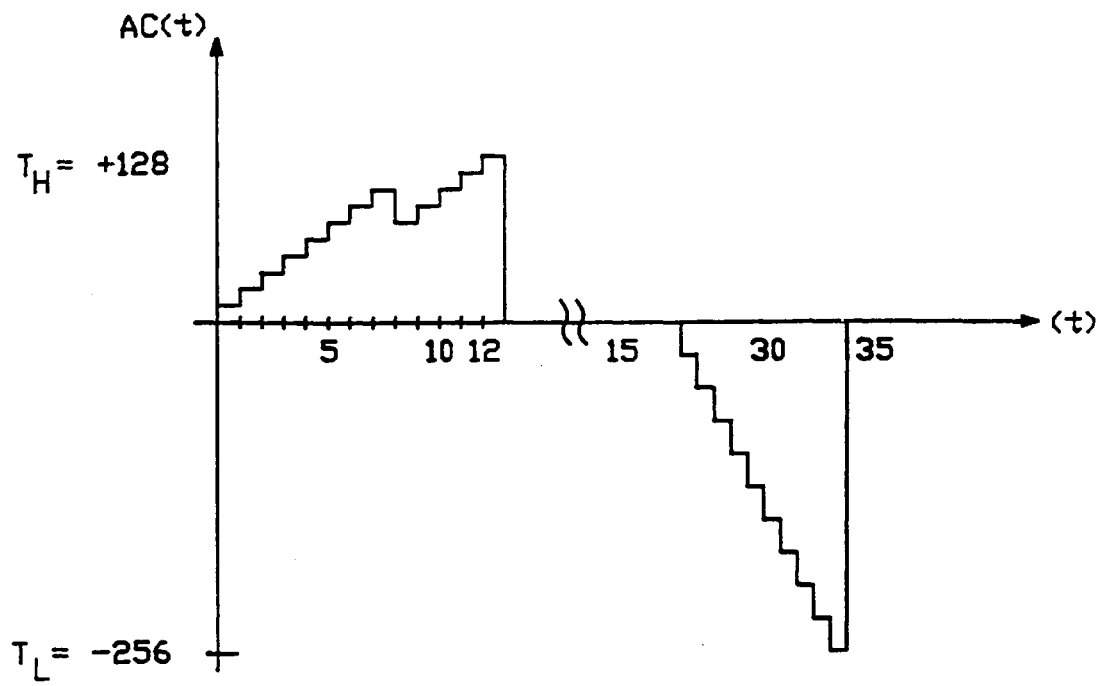
FIG. 5 depicts a representation of operation for various states as a function of the activity measurement.

Referring to FIG. 5, the value of AC(t) as a function of t is shown. In the example of FIG. 5, the first eight values of t find keyboard polling occurring by the I16 interrupt so that +12 is added to AC(t) for each of the first eight values of t. In FIG. 5, at t=8, the timer interrupt I8 occurs and subtracts −25 from the AC(t) value. Thereafter the keyboard polling continues until the value of AC(t) reaches 128, the value of $T_H$ in the example of FIG. 5. At t=12 in FIG. 5, AC(t) is reset, for example, to 0 when the computer system enters the conservation (idle) mode. At about t=20 in FIG. 5, which may include a long time duration generally indicated by the broken line at about t=15, video interrupt I10 becomes active and starts to add −25 to the AC(t) value until at about time t=35 the value of AC(t) reaches the −256 value of the threshold $T_L$.

When the value of AC(t) is above $T_H$, then the software monitor is operative to switch the computer system into the conservation mode. Whenever AC(t) is in below the threshold $T_L$, the software monitor is operative to switch the computer system back to the active mode.

The example of FIG. 5 is only for purposes of representing the manner in which AC(t) is incremented as a function of the positive and negative interrupt call numbers. Of course, other counting methods may be employed. In the program of TABLE 2, after the $T_H$ value of +128 is reached, the counter is reset to +256 and each value of Da decrements the count until the threshold TL is reached at 0.

Figure 6:
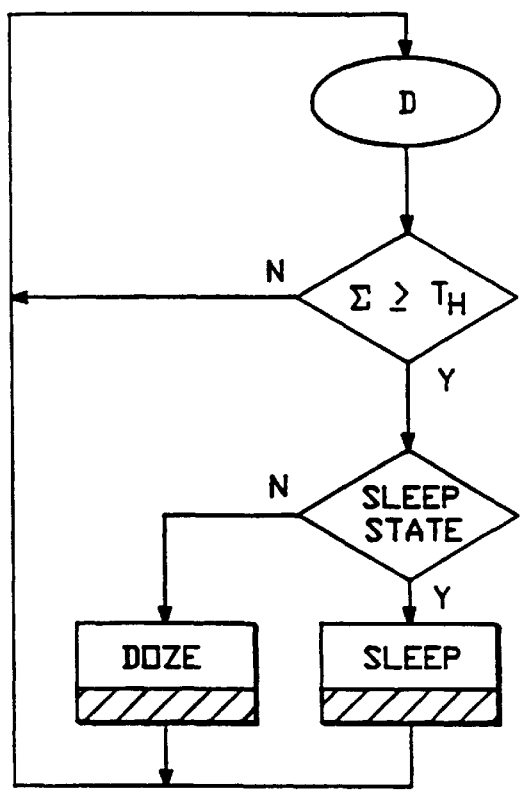
FIG. 6 depicts a state diagram depicting switching to conservation mode (DOZE or SLEEP state) operation under control of the software monitor.

The operation which occurs when the value of AC(t) exceeds the threshold $T_H$, is explained with respect to the flowchart of FIG. 6.

In FIG. 6, the value of D (either Da or Di), the interrupt number value, is added as indicated in Eq. (1) to form the accumulation value of the activity measurement, AC(t). This accumulation is indicated by the oval marked D in FIG. 6.

Next, the value of AC(t) is compared with the threshold $T_H$. If the value of the summation in Eq. (1) is not greater than the threshold, $T_H$, then the N no choice is made the loop repeats so that the next value of D is added to the AC(t) activity measurement. For example, in FIG. 5, this activity continues until approximately t=12 in FIG. 5.

In FIG. 5, at about t=12, the activity measurement AC(t) equals or exceeds the threshold $T_H$ and hence the Y output of the comparison connects to the SLEEP state detector. If already in the state, then the Y output will force the computer system to remain in the SLEEP state. If not in the SLEEP state, then the software monitor will force the computer system into the DOZE state.

Note that the FIG. 6 operation will force the computer system into the DOZE or SLEEP state as long as the activity measurement AC(t) exceeds the threshold $T_H$. When the threshold $T_H$ has been exceeded, AC(t) is reset and remains reset until another activity event, Da or Di, occurs. In FIG. 5, for example, this occurs at about t=20 when AC(t) begins to count toward $T_L$.

In addition to the comparison of the activity measurement AC(t) against the upper threshold $T_H$, the software monitor 80 also compares the value of the activity measurement against the lower threshold $T_L$. This comparison is represented by the flowchart of FIG. 7.

Figure 7:
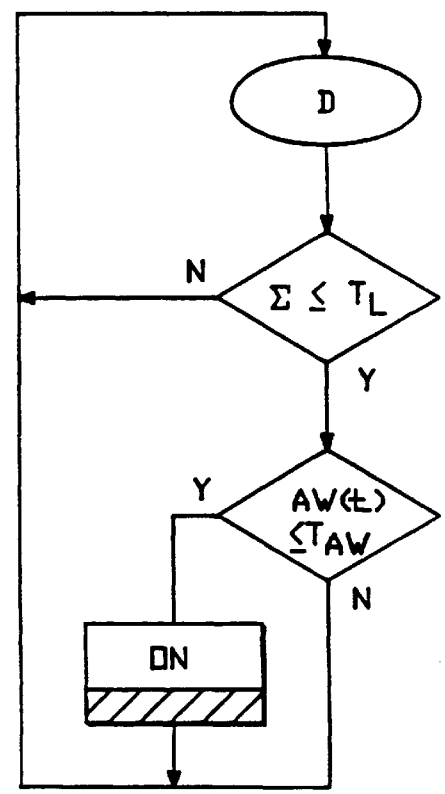
FIG. 7 depicts a state diagram depicting the sequencing which forces to the ON state during an activity window period under control of the software monitor.
Figure 8:
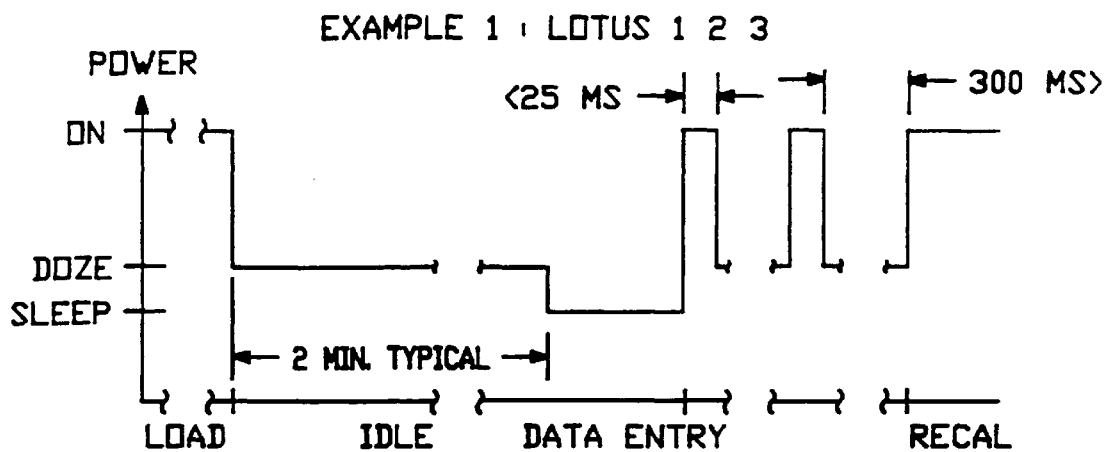
FIG. 8 depicts a representation of operation for a spreadsheet application program.
Figure 9:
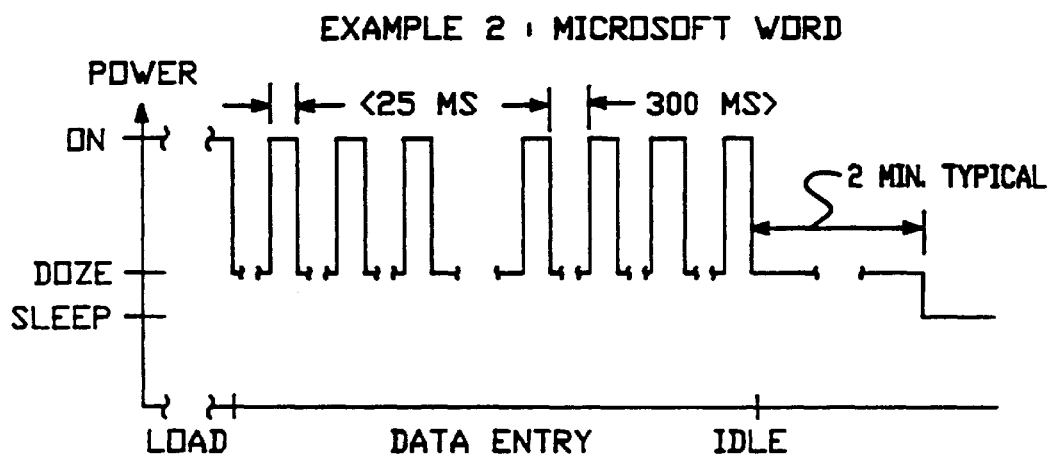
FIG. 9 depicts a representation of operation for a word-processing application program.

In FIG. 7, the oval represents the incrementing of the activity measurement AC(t) in accordance with Eq. (1). After each incrementing of the activity measurement, the value of AC(t) is compared to determine if it is less than or equal to $T_L$. If not, then the N output of the comparison continues the incrementing of the activity measurement for each new value determined in accordance with Eq. (1).

If the activity measurement AC(t) is less than or equal to $T_L$, then the Y output of the comparison connects the operation to the activity window comparison.

If $AC(t) \leq T_L$ and $AW(t) \leq T_{aw}$, then the FIG. 7 operation switches to the ON state.

If $AC(t) \geq T_H$, then test sleep state.

where, $T_H > K_1$
$T_L < K_2$
$T_H$=Idle Threshold
$T_L$=Activity Threshold
  $K_1$=128
  $K_2$=−256

Combined Hardware Monitor and Software Monitor Operation

If the system is in ON state and AC(t) is greater than or equal to $T_H$, the power management software monitor will bring the system into DOZE state. If the system is already in DOZE or SLEEP state, no further action will be needed. Similarly, the activity count, AC(t), will be decremented every time an active function call, Da, is made. The activity count is then used to compare with the active threshold. If the count is higher than the active threshold, $T_H$, then the power management software monitor 80 will force the system into the power conservation mode (DOZE or SLEEP) per the FIG. 6 operation regardless of the status of the hardware monitor 79. If the activity count is equal to or less than the active threshold, $T_L$, then the system will be programmed into the ON state.

The ON state can also be entered if the hardware monitor 79 detects a predetermined set of address ranges on bus 5. For example, the predetermined set of address ranges monitored for power management typically includes all of the I/O address range, that is, the addresses of the I/O controllers 6-0 through 6-n, and the video memory address range for the video memory locations 8 with the memory 11. Of course, other address ranges can be added to or used as the predetermined set for power management. The set of address ranges including the video memory and the I/O address range has been found to provide excellent information for controlling power management.

After entering the ON state, the power management unit will continue to be in the ON state until any idle function call detects the activity count has reached or gone beyond the idle threshold, $T_H$.

Figure 10:
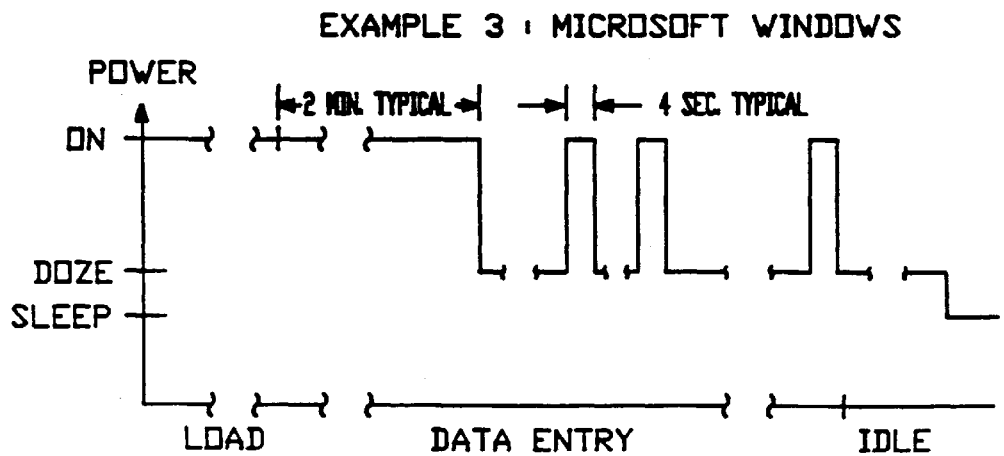
FIG. 10 depicts a representation of operation for a windowing application program.

There are application programs such as Microsoft's Windows described in connection with FIG. 10 that do not use the DOS idle function calls and therefore the system would never go into the DOZE state through operation of the software monitor 80. Therefore, a watch dog timer is built into the power management software monitor to monitor the absence of idle function calls as indicated in connection with FIG. 7. If a time period greater than $T_{aw}$ as shown in the flow chart in FIG. 7 has been exceeded without any idle function call being made, then it is assumed that the application program bypasses DOS and goes directly to the hardware.

During the $T_{aw}$ time period (see FIG. 7) the power management unit will be forced into the ON state until detection of activity for predetermined period of time, $T_{aw}$. This period, $T_{aw}$ is normally more than a minute in order not to affect the system performance. There is no power saving during the time out period, $T_{aw}$, even if the CPU is actually idling. After the $T_{aw}$ time period, the hardware monitor 79 will take over completely.

In most cases, application programs go through DOS to perform I/O operations. The power management software monitor 80 keeps track of all the operating system function calls. If the accumulative count of all active and idle function calls is greater than the upper threshold, $T_H$, then the system is assumed to be inactive. The power management software monitor will program the power management unit to DOZE state only if the system is still in ON state. The computer 3 will enter DOZE state without waiting for the ON state timer to expire and therefore maximizes the power saving of the system. If computer 3 is already in DOZE or SLEEP, no action will be needed from the power management software monitor until the system becomes active again.

In the software monitor 80, inactivity is determined by detecting how many active or idle function calls an application makes within some time period. In the IBM PC DOS environment, the activity status is checked no less frequently than every 50 milliseconds. There are 256 IBM PC DOS function calls and each is labeled as idle or active with a corresponding positive or negative number. A positive number is assigned to an active function call and a negative number to an idle function call. The power management software module keeps a running total of the accumulated value of the function call numbers as the function calls are made. Whenever a function call is made, (either active or idle), the power management software module algebraically adds the number to the accumulated value and decides whether the system is active or not by comparing the magnitude of the accumulated value with a function call threshold. The function call threshold for determining activity is a variable depending on the computer system speed.

To prevent the system from oscillating between the active and idle state due to minor changes in system activity, hysterisis is provided by using active, $T_L$, and idle, $T_H$, function call thresholds. The accumulated total is clamped at $T_H$ after it reaches the active thresholds $T_H$ or $T_L$ as the case may be. The active and idle thresholds are typically unequal (128 and −256) so that the entry and exit from conservation (idle) mode is biased. For example, in order to have the system enter the idle mode quickly and thereby to reduce power consumption, the active threshold is set with a threshold number (128) greater than the idle threshold number (−256). Also, functions that require immediate attention are assigned numbers large relative to the active and idle thresholds so that a single occurrence of the function call (for example, I14=−400) will force the accumulated count over the active threshold ($T_L$=−256) and thus force the system to be in the active mode. The hysterisis effect can be bypassed by forcing the power management unit into active mode without changing the activity count. In this case, the next idle function call will bring the system back to idle mode.

If the software monitor 80 or the hardware monitor 79 indicates inactivity, the power management unit enters the conservation mode which has multiple states with different levels of power conservation.

The hardware monitor 79 works in conjunction with the software monitor 80 linked to the operating system during boot up time. The state control unit 23 is controlled by the timer unit 24 and power management software module 100. The power management software will override the hardware timer unit 24 whenever inactivity is detected in the operating system level. Since this can be done in a much finer resolution than the hardware monitor 79, the combined software and hardware monitor maximize power saving without any degradation in system performance.

Power Management Unit Detail—FIG. 3

Line List

In FIG. 3, the following lines and functions are defined for the connections output (O) from and input (I) to the PMU 15 of FIGS. 1 and 2.

| Name | Type | Function |
|---|---|---|
| SA[0..9] | I | System Address on bus 5 |
| SD[0..7] | I/O | System Data on bus 5 |
| VP0 | O | LCD power control |
| VP1 | O | EL backlight power control |
| VP[2..7] | O | Peripheral power control |
| *RAS | O | *RAS for DRAM |
| *CAS | O | *CAS for DRAM |
| *PCRAS | I | *RAS for DRAM |
| *PCCAS | I | *CAS for DRAM |
| *VCS | I | Video RAM chip select |
| *IOR | I | I/O Read |
| *IOW | I | I/O Write |
| *S1 | I | Status, low indicates read or mem read operation |
| AEN | I | DMA enable |
| INMI | I | NMI input from user system |
| NMI | O | NMI output to CPU |
| INTR | I | Int request output of computer |
| DRQ[0..3] | I | DMA requests which could occur in DOZE or SLEEP |
| *DACK0 | I | Indicates refresh DMA cycle |
| EXT | I | External command input (button) |
| RI | I | Ring indicator from modem |
| RTC | I | Alarm output from RTC |
| CLKI | I | CPU clock input |
| CLKOUT | O | Clock out to CPU |
| LB | I | Low battery detect, first warning |
| LLB | I | Low battery detect, second warning |
| ACPWR | I | AC power good input |
| *RESET | I | External RC required for reset |
| *REFRSEL | O | Low when PMU controls DRAM refresh |
| OSC | I | Xtal osc output |
| CLK1IN | I | Clock 1 in for switched clock 1 out |
| CLK1OUT | O | Switched clock 1 out |
| CLK2IN | I | Clock 2 in for switched clock 2 out |
| CLK2OUT | O | Switched clock 2 out |
| LBPOL | I | Low battery polarity select |
| STATIC_CPU | I | Connect to Vcc if CPU is static |
| VCC | | Power |
| VSS | | Ground |

Registers

In FIG. 3, the PMU 15 includes a number of registers accessed for read or write by CPU 4 over bus 5 via an index register addressing scheme. When not accessed by CPU 4, for example, after a power on detection by detector 71, the registers are all initialized to a default state. When accessed by CPU 4, an index value is first written to the index register 50 from bus 5 and the index value is decoded by decoder 70 to select one of the registers of PMU 15 for access to bus 5 to receive or send information from or to CPU 4. The index register 50, after an index write, is changed to point to another register to be accessed. When reset, the index register is not active to enable any PMU 15 register. This is a safety feature to help prevent applications executing on the CPU 4 from inadvertently accessing PMU 15 registers. All registers may be read and written over bus 5.

The PMU 15 data registers are:

| Data Register (Ref. No.-FIG. 3) | | Index Decode | |
|---|---|---|---|
| STATUS | 51 | 00H | |
| SUPPLY | 52 | 02H | |
| CONTROL | 53 | 04H | |
| ACTMASK | 54 | 06H | |
| NMIMASK | 55 | 08H | |
| OSC | | 56 | 0AH |
| PWRON | 57 | OCH | |
| PWRDOZE | 58 | 0EH | |

-continued

| | | | | |
|---|---|---|---|---|
| PWRSLEEP | | 59 | | 10H |
| PWRSUSPEND | | 60 | | 12H |
| POLARITY | | 61 | | 14H |
| OUTPUT | 62 | | | 16H |
| DOZE | | 63 | | 18H |
| SLEEP | 64 | | | 1AH |
| SUSPEND | 65 | | | 1CH |
| LCD | | 66 | | 1EH |
| EL | 67 | | | 20H |

Status Register

| Bit | Name | Function |
|---|---|---|
| D7 | RESUME | Resuming from SUSPEND (warm start) |
| D6 | WU1 | Wakeup code MSB |
| D5 | WU0 | Wakeup code LSB |
| D4 | NMI2 | \ |
| D3 | NMI1 | > NMI cause code |
| D2 | NMI0 | / |
| D1 | STATE1 | State MSB |
| D0 | STATE0 | State LSB |

In register 51, only D0 and D1 are affected by a write. The CPU 4 can write the state code to this register to put the PMU in another state. Writing OFFh puts it in the OFF state. The NMI cause, state and wakeup codes are decoded as follows:

| Code Wakeup | NMI Cause | Code | State | Code Cause |
|---|---|---|---|---|
| 000 | None, or INMI | 00 | On | 00 |
| 001 | EXT input | 01 | DOZE | 01 EXT input |
| 010 | LB | 10 | SLEEP | 10 RTC |
| 011 | LLB timeout | 11 | SUSPEND | 11 R I |
| 100 | SLEEP timeout | | | |
| 101 | SUSPEND timeout | | | |

*RESET sets STATE[0 . . 1] and clears all other bits.

Supply Register

This register 52 is read only. D[0 . . . 2, 5] are driven directly by the input lines. Bit D3 is set when system activity is detected and is cleared when this register is read.

| Bit | Name | Function |
|---|---|---|
| D5 | STATIC_CPU | 1 = Static CPU (clock stops in DOZE) |
| D4 | DRAMRDY | 1 = CPU controls DRAM (same as *REFRSEL) |
| D3 | ACTIVITY | System activity present |
| D2 | LLB | Low battery 2 (second warning) |
| D1 | LB | Low battery 1 (first warning) |
| D0 | ACPWR | AC power input in range |

Control Register

| Bit | Name | Default | Function |
|---|---|---|---|
| D7 | | 0 | |
| D6 | RING2 | 0 | \ |
| D5 | RING1 | 0 | > Number of RI pulses required for turnon |
| D4 | RING0 | 1 | / default = 1 |
| D3 | STATIC_CPU | 0 | For static CPU's |
| D2 | SLOW | 0 | Clock runs slow in ON |
| D1 | CCLK1 | 1 | CPU Clock divisor, DOZE and SLEEP |
| D0 | CCLK0 | 0 | / default divisor = 4 |

In register 53, the RING[0 . . . 2] bits are used to set the number of RI pulses required for turnon. The default value is 1 so that only one pulse is required for turnon. If set to 0, RI is disabled. State logic 23 has conventional logic for detecting and counting RI pulses from a modem, one of the I/O peripherals 7-0 to 7-n. D3 is only used for static CPU's. SLOW indicates reduced clock speed operation in On. The CCLK[0 . . . 1] bits select the clock divisor for CLKOUT in SLEEP and DOZE states, and in ON if SLOW is set, according to the table.

| CCLK[0 . . 1] | Divisor |
|---|---|
| 0 | 1 |
| 1 | 2 |
| 2 | 4 |
| 3 | 8 |

ACTMASK Register

| Bit | Name | Default | Function |
|---|---|---|---|
| D7 | | 0 | |
| D6 | MSK_VIDM | 0 | Mask access to video memory |
| D5 | MSK_DMA | 0 | Mask all DMA activity |
| D4 | MSK_P63 | 1 | Mask access to port 63h |
| D3 | MSK_PIC2 | 0 | Mask access to port A0h, A1h |
| D2 | MSK_RTC | 1 | Mask access to port 70h, 71h |
| D1 | MSK_KBD | 0 | Mask keyboard (port 60H,64H) |
| D0 | MSK_IO | 0 | Mask access to all ports not maskable by D[2 . . 5] |

The activity monitor ACTIVITY output is the logical OR of all unmasked activity sources. This register 54 affects only the ACTIVITY output. Refresh DMA cycles (*DACK0 low), interrupts, or accesses to the PMU 15, never affect the activity monitor 16.

NMIMASK Register

This register 55 masks the various NMI sources. In the default state only the INMI input can generate NMI.

| Bit | Name | Function | Default |
|---|---|---|---|
| D6 | OS2 | Mask INMI input | 0 |
| D5 | MSK_SUSPEND | Mask SUSPEND timeout | 1 |
| D4 | MSK_SLEEP | Mask SLEEP timeout | 1 |
| D3 | MSK_LLB | Mask LLB input | 1 |
| D2 | MSK_LB | Mask LB input | 1 |
| D1 | MSK_EXT | Mask EXT input | 1 |

OSC Register

| Bit | Name | Default | Function |
|---|---|---|---|
| D7 | OSCDIV3 | 1 | \ |
| D6 | OSCDIV2 | 1 | OSC input divisor −1 |
| D5 | OSCDIV1 | 0 | default code = 1101 |
| D4 | OSCDIV0 | 1 | (divisor = 14) |
| D3 | | | / |
| D2 | SLWREF | 0 | Slow refresh DRAM |
| D1 | RASWIDTH1 | 0 | *RAS pulse width MSB |
| D0 | RASWIDTH0 | 0 | *RAS pulse width LSB |

Referring to register 56, OSCDIV[0 . . . 3] plus one is the OSC frequency in MHz, except for OSCDIV[0 . . . 3]=13, the default, indicates 14.318 MHz. SLWREF is set when slow refresh DRAM is used. RASWIDTH[0 . . . 1] indicates the width of the *RAS pulse in units of OSC periods. The default value is 0 which disables refresh in SUSPEND state, and no RAS/CAS is generated. Values of 1 to 3 indicate 1 to 3 OSC periods.

PWR Registers

The bits D[0 . . . 7] in these registers 57 through 60 correspond directly with the power control outputs VP[0 . . . 7]. In a particular state, the corresponding PWR register outputs control the VP lines 23. The exception is VP0 and VP1 which are LCD and EL power, respectively. These outputs are AND'ed in AND gates 41 and 42 with the LCD and EL timer outputs prior to driving the lines 33. All bits are then exclusive NOR'ed in gates 35 with the POLARITY register 61, and the result drives the lines 33. The default values for these registers are as follows, where 1 indicates that the controlled device is on:

|  |  |
| --- | --- |
| PWRON | FFh |
| PWRDOZE | FFh |
| PWRSLEEP | 0Fh |
| PWRSUSPEND | 00h |

POLARITY Register

This register 61 controls the polarity of the VP outputs. If a logic low is required on a VP line to turn the external device on, the corresponding bit in the POLARITY register 61 must be low. If a high is required, set the bit high.

Timer Registers

The nonzero value loaded into one of the timer registers 63 through 68 is the actual timeout minus one. A zero disables the timeout. Therefore a 4 bit timer can be set for a timeout from 1 to 15 time units. Reading a timer register returns the value that was last written to it, not the actual time remaining. The default values are tabulated below:

| Timer | Range | Default |
| --- | --- | --- |
| DOZE | 1–15 sec | 5 sec |
| SLEEP | 1–15 min | 2 min |
| SUSPEND | 5–75 min | 0 (disabled) |
| LCD | 1–15 min | TBD |
| EL | 1–15 min | TBD |

OUTPUT Register

The OUTPUT register 62 is a read only register. For each VP[0 . . . 7] output that is on, the corresponding bit in the OUTPUT register will be set.

The control and logic functions for the activity monitor 16, the state logic 23, the NMI logic 21, and other components of FIG. 3 are conventional logic circuits for implementing the logic and control functions hereinafter described or alternatively are the software logic of TABLE 1.

ON State

Figure 4:
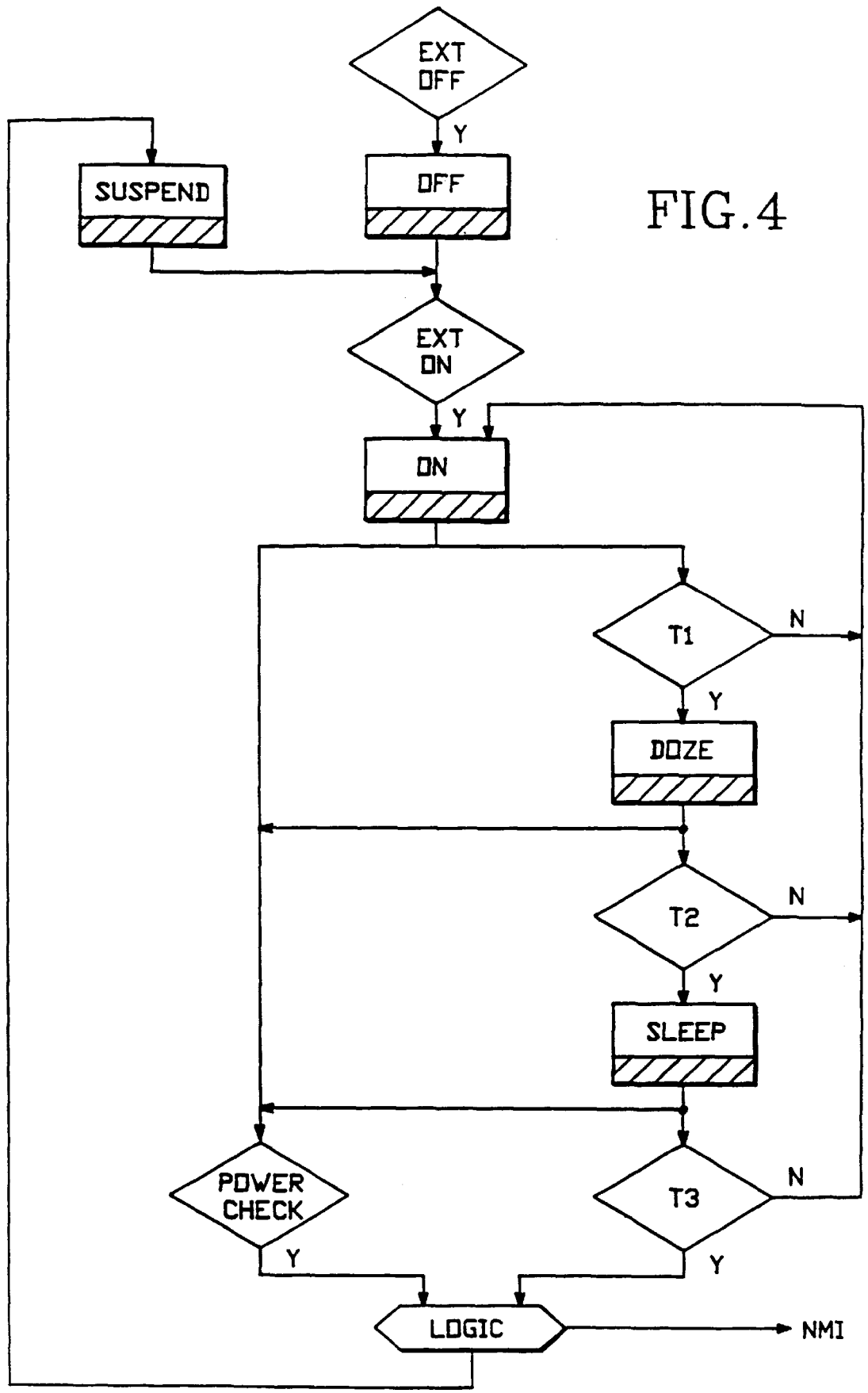
FIG. 4 depicts a state diagram depicting the multiple states associated with the power management unit of FIGS. 1, 2 and 3 as determined by the hardware monitor.

Referring to FIG. 4, the ON state is entered from the SUSPEND or OFF state when the *RESET input is low, and also when one of EXT, RTC or RI goes high if ACPWR is true or LB is false. It is entered from DOZE or SLEEP when the activity monitor 16 detects activity with addresses in the predetermined address set. In the ON state encoded on lines 34, all power control outputs VP[0 . . . n] will be controlled by the PWRON register 57. Upon entering the ON state, the DOZE timeout timer 63 will be retriggered. The LCD and EL timeouts in timers 66 and 67 will be retriggered when entering the ON state from SUSPEND or OFF. The retrigger lines from STATE logic 23 to the timers are not shown in FIG. 3 for clarity.

In FIG. 3, the STATE logic 23 recieves the CPU data bus D(0 . . . 7) from bus 5 for receiving state commands issued by the software monitor 80 of TABLE 2. The STATE logic also receives the address detection line 76 from activity monitor 16 which enables the STATE logic 23 to receive the state commands from the software monitor when addressed over the bus 5.

If the SLOW bit in the control register 53 is false, the CLKOUT rate on line 28 will be full speed. If the SLOW bit is true, CLKOUT will be as specified by the CCLK[0,1] bits in register 53. This clock control allows the user to save power, for example, when running non-computationally intensive applications such as word processing.

DOZE State

The DOZE state is entered from the ON state when the activity monitor 16 has not detected activity and therefore has not provided the ACTIVITY signal within the time, T1, specified by the DOZE timer 63. In the DOZE state encoded on lines 34, the power control outputs VP[0 . . . 7] from unit 17 are controlled by the PWRDOZE register 58. If a non-static CPU 4 is used, the clock on line 28 will be slowed as specified by CCLK[0,1] in register 53.

If a static CPU 4 is used, CLKOUT on line 28 will stop in the low state immediately following a non-DMA memory read instruction, as indicated by *S1 going high while *AEN is low, so that no chip select will be low. If INTR goes high, CLKOUT will be enabled until after EOI is written to the interrupt controller with INTR false. If INMI goes high, CLKOUT will be enabled. If an internally generated NMI occurs, CLKOUT will be enabled until the NMIMASK register 55 is read. If any DRQ goes high, CLKOUT will be enabled until after the next memory read instruction with AEN and all DRQ inputs false. The enable request functions for INTR, INMI, internal NMI and DMA are separate and CLKOUT is enabled when any event requests it, so that an interrupt handler in CPU 4 will run to completion even if it is interrupted by a DMA request. These enable request functions are independent of the activity monitor and the ACTMASK register 54. Enabling CLKOUT does not cause the PMU 15 to leave DOZE, unless the activity monitor 16 is subsequently triggered. If this trigger occurs, the PMU 15 will enter the ON state and the enable request logic will be cleared.

SLEEP State

The SLEEP state is entered when the PMU 15 has been in the DOZE state for the time, T2, specified by the SLEEP timer 64 and no ACTIVITY signal has occurred. In the SLEEP state, the CLKOUT operation is the same as in DOZE. The power control outputs are controlled by the PWRSLEEP register 59.

Alternatively, the PMU can be programmed to generate NMI and remain in DOZE state instead of automatically entering SLEEP.

SUSPEND State

The SUSPEND state is entered when the PMU 15 has been in the SLEEP state for the time, T3, specified by the SUSPEND timer 65 or when a power check detects low battery signals, LB or LLB. The SUSPEND state is entered after these conditions only when the CPU 4 writes the code for SUSPEND to the STATUS register 40 and this operation requires software support because in SUSPEND the CPU operation is affected. In SUSPEND operation, CLKOUT is the same as CLKI. The power control outputs are controlled by the PWRSUSPEND register 60. In SUSPEND, the CPU 4 and the device (for example, a switch) which generates the system reset signal must be powered off. Only activity on the EXT, RI or RTC inputs can cause an exit from SUSPEND, and the new state after exit will be ON. When the reset circuit power is restored, it will reset the CPU 4, which will then execute a warm startup routine in a conventional manner. DRAM refresh may be enabled in SUSPEND. If DRAM refresh is not enabled, the PMU 15 does not need OSC from unit 43 in SUSPEND, and gates it off internally to minimize OSC power consumption. The OSC output will stay low. The bus interface is inhibited, and the data bus 5 is tristated.

OFF State

The OFF state is entered when the CPU 4 writes the code of OFF (OFFh) to the STATUS register 51. It is also entered 5 seconds after the EXT input goes high if the NMI is not serviced.

The OFF state is meaningful only when the PMU 15 is powered from a battery while the rest of the computer 3 is turned off. This type of power connection is necessary only if the PMU 15 must awaken the system from the OFF state by activating VP outputs on lines 33 in response to transitions on the EXT input. If this function is not required, then the PMU 15 may be powered off when the system is powered off, and the OFF state as described below is not required.

In the OFF state, all outputs from the PMU 15 are either low or tristated, and all devices other than PMU 15 in the computer 3 are powered off. Any inputs will have pulldowns so that floating inputs, if any, will not cause increased power dissipation. Only activity on the EXT, RI or RTC inputs can cause an exit from OFF, and the new state will be ON. The bus 5 interface is inhibited and data bus 5 is tristated.

Activity Monitor

The activity monitor 16 includes an address detector 73 which receives addresses from bus 5 representing the address activity of the CPU 4. The address detector 73 receives, for example, control lines and address lines SA(0 . . . 9) from bus 5 for sensing when those addresses are within the predetermined address set. The predetermined address set is defined, for example, by an address set specified by ACTMASK register 54. The detector 73 compares or masks the address set specified by register 74 with the addresses on bus 5 and provides an address detect signal on line 76 to the logic 77. The logic 77 receives the other inputs to the activity monitor 16 and combines them, using conventional logic circuitry, to provide three outputs.

The three outputs provided by activity monitor 16 are produced by conventional logic or by software as shown in TABLE 1. The EXTRIG output is a function of keyboard activity only and is used to retrigger the EL backlight timer 67. The LCDTRIG output is true for keyboard activity or video memory writes, and retriggers the LCD timer 66. The ACTIVITY output is an OR function of a programmable selection of different activities specified in the ACTMASK register 54. When active, this output returns the PMU 15 to the ON state and retriggers the DOZE timeout timer 63. The activity monitor 16 does not produce the ACTIVITY output in response to accesses to the registers of PMU 15.

OSC Programmability

The OSC frequency of refresh control unit 20 provides the timebase for the timers and the refresh for DRAM memory 11. The PMU 15 may be programmed to accept a range of OSC frequencies. The OSC frequency of oscillator 43 is fed to a counter 44 which divides it by a divisor which is programmed in the OSC register 56. The programmable counter output of divider 44 is divided to produce 256 Hz which is used by the refresh control logic 48. Further dividing in divider 46 produces 32 Hz for slow refresh to refresh control logic 48, and 8 Hz and 1/(7.5) Hz for use by the timers 63, 64, 65 and 68.

Timers

There are six timers in the PMU 15, namely, DOZE timer 63, SLEEP timer 64, LB (low battery) timer 68, SUSPEND timer 65, EL (backlight) timer 66, and LCD timer 67. Each of the six timers a 4-bit register loadable by CPU 4 over bus 5. Setting a timer register to 0 disables it; setting it to a nonzero value enables it. If enabled, certain timers are triggered by the transition to the ON state. Individual timers are also triggered by events specific to their functions. Some timers are retriggerable, timing out at a programmable time following the last trigger.

The DOZE timer 63 is programmable from 1 to 15 seconds with a resolution of 1 second, and the SUSPEND timer 65 is programmable from 5 to 75 minutes with a resolution of 5 minutes. All other timers are programmable from 1 to 15 minutes with a resolution of one minute. There is a quantization error associated with retriggering any timer. This error is a quantization error associated with retriggering any timer. This error will cause the actual timeout to be up to ⅛ of the resolution of the timer longer (but never shorter) than the programmed value. The error does not vary with the programmed value.

The LCD timer 66 and the EL timer 67 are retriggerable. The timer outputs are AND'ed in AND gates 41 and 42 with the power control bits selected by the power control multiplexer 76 according to the current PMU state to control the LCD (VP0) and EL (VP1) power control outputs to EXOR 35. This operation provides the flexibility to turn the EL and LCD outputs off when the associated timers 66 and 67 time out, or to control the outputs in any PMU power-management state under control of multiplexer 76.

The DOZE timer 63 is retriggerable and is triggered by the activity monitor ACTIVITY output in the ON state, and triggers the transition to DOZE state when it times out.

The SLEEP timer 64 is triggered when the DOZE state is entered and is cleared when the DOZE state is exited. Timer 64 either generates NMI or triggers the transition to SLEEP state when it times out.

The SUSPEND timer 65 is triggered when the SLEEP state is entered and is cleared when SLEEP is exited. If unmasked, an NMI will be generated when it times out.

The LB timer 68 is enabled when ACPWR is false (no AC power). Timer 68 is triggered when LB is first detected. If unmasked, NMI is generated by the LB timer 68 output once per minute when it times out, until a period of one minute elapses during which LB remains continuously false. The NMI cause will be identified as an LB or LLB interrupt. Software can maintain a counter and display a message once per X interrupts. It can also monitor LLB and shut the computer down after Y interrupts. It can also monitor LLB and shut the computer down after Y interrupts with LLB true.

NMI

The PMU unit 15 OR's together a number of internally generated NMI requests to produce the NMI output on line 27. These requests can be masked by bits in the NMIMASK register 55. The INMI input comes from conventional external NMI-generating logic such as a parity detector, and can be OR'ed with the internal NMI requests to generate NMI when unmasked by the OS2 bit in the NMIMASK register 55. The NMI output on line 27 generally goes to the CPU NMI input, except on OS2 systems where it must go to an IRQ. The NMI CAUSE code bits in the Status register 40 indicate the cause of the NMI on line 27. An internally generated NMI is cleared by reading the NMIMASK register 55.

NMI may be generated to indicate a low battery when ACPWR is false.

If the MSKSLEEP bit is cleared, the PMU 15 will generate NMI when the SLEEP timer 64 times out and remain in DOZE instead of entering SLEEP.

NMI is also generated when the SUSPEND timer 65 times out. Software can then save status and go to SUSPEND or OFF state.

A high on the EXT input while not in the OFF or SUSPEND state will generate NMI. Software can then save status and go to SUSPEND or OFF state. If the NMI is not serviced within 5 seconds, the PMU 15 assumes there is no software support for SUSPEND and will turn all power off and enter the OFF state.

Refresh In SUSPEND State

Refresh is enabled by setting the RASWIDTH[0 . . . 1] bits in the OSC register 56 to a nonzero value. This enables OSC to run in SUSPEND mode, and the RASWIDTH value also sets the width of the *RAS pulse in units of OSC clock periods. Slow refresh is enabled by setting SLWREF high. The PMU 15 generates *MRAS and *MCAS signals to mux 32 to refresh DRAM while the CPU is powered off or being reset. When the CPU is active, the *PCRAS, *PCCAS signals on lines 30 from the PC controller 13 are selected by multiplexer 30 to provide the *RAS, *CAS signals on lines 29. *REFRSEL on line 72 will go low to indicate that the PMU 15 is controlling refresh and high for PC controller 13 control.

If enabled, the DRAM refresh outputs are active in SUSPEND. When entering SUSPEND, the PMU 15 immediately generates a burst of 1024 CAS before RAS refresh cycles. A burst of 256 cycles is then repeated every 3.9 ms if SLOWREF is false or every 31.25 ms if SLOWREF is true. After entering the ON state from SUSPEND, the PMU 15 generates bursts of 1024 refresh cycles over 2.9 ms. This operation allows as much time as needed for CPU power stabilization, crystal oscillator startup and CPU reset. When the CPU is ready to take over control of the DRAM, it must poll the SUPPLY register 38 until the DRAMRDY bit goes high. The PMU 15 senses the polling operation as a request from the CPU for DRAM control, and at the end of the first refresh burst following a CPU I/O read of the SUPPLY register 38, the PMU 15 sets *REFRSEL high to return control of the DRAM to the CPU. The DRAMRDY bit is essentially the same signal as *REFRSEL.

The purpose of the bursts when entering and leaving SUSPEND is to eliminate violations of the refresh rate spec when switching between external refresh row address generation (DMA cycles during ON) and internal row address generation (CAS before RAS during SUSPEND).

Pseudostatic RAM refresh is also supported. When *REFRSEL goes low, *RAS can drive *RFSH low for auto refresh mode. The burst refresh will assure that switching between external and internal refresh will not violate the refresh rate spec. Self refresh can also be used by driving *RFSH low when *REFRSEL is low, but other logic will have to generate the refresh burst when entering and leaving SUSPEND, if required.

External Wakeup Inputs

RI is a rising edge sensitive input, to state logic 23 from a modem ring indicator RI output of a peripheral 7. The number of rising edges required for this input to be recognized is specified in bits D[4 . . . 6] of the Control register 53. The default is one transition. If these bits are zero, this input is disabled. If enabled, a rising transition on this input will force the PMU 15 to the ON state.

RTC is an edge sensitive wakeup-alarm input from a real time clock in CPU clock control 49 of FIG. 3. A rising or falling transition on this input will force the PMU 15 to the ON state.

EXT is a rising edge sensitive input, intended for use with an external pushbutton. A rising transition on this input while the PMU 15 is in OFF or SUSPEND will force the PMU 15 to the ON state. A transition in ON, DOZE or SLEEP will generate NMI.

EXT is debounced in ON, DOZE and SLEEP in a conventional debouncer circuit 36. A rising edge immediately generates NMI but only if EXT has been sampled low at least twice by a 32 Hz debounce clock from counter 46 prior to the rising edge. The debounce clock is derived from OSC 43 and therefore may be stopped in SUSPEND and OFF, so the PMU 15 will not enter these states until the debounce operation is completed. To prevent resuming due to contact bounce on the release of a pushbutton, the PMU 15 will defer execution of a change of state command from the CPU 4 until after the EXT input has been sampled low twice by the debounce circuit 36. This operation is typically transparent to software. For example, if the user presses the button in ON, the PMU 15 will generate NMI, and the CPU will write the command to enter SUSPEND and then execute a halt instruction. Nothing will happen until after the pushbutton is released, at which time the PMU 15 will enter SUSPEND.

Resume and Power On

The PMU 15 has its own private *RESET signal, typically from an external RC network detector 71 which detects VCC. This signal resets only the PMU 15 when power, VCC, is first applied to it. A separate reset signal must be generated by external hardware for the CPU when entering the ON state from SUSPEND or OFF state. At power on, the CPU 4 must read the RESUME bit in the Status register 51. RESUME will be cleared if the startup is a cold start from OFF and will be set to indicate a warm start (resume) from SUSPEND. If RESUME is cleared, the wakeup bits WU[0 . . . 1] in the Status register 51 will be zero, otherwise they will indicate which external input caused the resume. The RESUME bit will be cleared after the Status register is read.

Clock Switching

The clock switch control 69 is provided to switch input clocks CLK1IN and CLK2IN clocks to output clocks CLK1OUT AND CLK2OUT for peripherals. The CLK1 and CLK2 operations are the same. For example, the CLK1IN is passed to the CLK1OUT output by control 69 in ON and DOZE. When entering SLEEP mode, CLK1OUT will stop synchronously in the low state. CLK1OUT will start synchronously when returning to the ON state.

Low Battery Detection

The LB and LLB inputs indicate low battery and low low battery as generated by a conventional battery level detector in power supply 9 of FIG. 1. The polarity of these inputs is programmable by the LBPOL line which can be strapped low or high. If this line is high, LB and LLB are high true. If low, these inputs are low true. The status of the LB and LLB lines after polarity correction can be read in the SUPPLY register 38. A low battery indication can generate NMI.

Power Sequencing

To minimize turnon transients, the turnon of VP1 (EL power) is delayed by 4 to 8 ms after OSC begins clocking, when entering the ON state.

Program Listing

A computer program embodiment of the hardware monitor for the power management unit appears in the following TABLE 1.

TABLE 1

```
;==================================================
;   Power Management Software
;==================================================
;
;       Copyright - 1989 Vadem, Inc.
;
;       All Rights Reserved.
;
;               C:
;==================================================
.xlist
include     romeq.dec
include     romdef.dec
include     seteq.dec
include     clkeq.dec
include     8250eq.dec
include     prneq.dec
include     crteq.dec
include     vg600.dec
include     notes.dec
include     kbdeq.dec
.list
include     pwreq.dec
CMSG        <Power Management BIOS Kernel>
pmdata segment  para public 'pmdata'
extrn       on_power_status:word
extrn       sleep_power_status:word
extrn       lb_event_handler:dword
extrn       lb_event_mask:word
extrn       doze_timeout:byte
extrn       doze_count:byte
extrn       sleep_timeout:byte
extrn       sleep_count:byte
extrn       kbd_timeout:byte
extrn       kbd_count:byte
extrn       pwr_off_timeout:word
extrn       pwr_off_count:word
extrn       led_time_on:byte
extrn       led_time_off:byte
extrn       led_next_event:byte
extrn       led_cycle_count:word
extrn       lb_def_event_type:byte
extrn       lb_event_rep:byte
extrn       lb_event_count:byte
extrn       sleep_save_buf:byte
extrn       pm_flags:byte
extrn       second_counter:byte
extrn       minute_counter:byte
extrn       one_shot_handler:dword
extrn       one_shot_timer:dword
extrn       lb_last_event:word
extrn       pm_ram_chksum:word
extrn       pm_save_ss:word
extrn       pNi_save_sp:word
extrn       pm_resume_stack:byte
pmdata      ends
data0       segment public 'DATA0'
extrn       crt_addr:word
extrn       reset_flag:word
data0       ends
code        segment   word public   'code'
assume      cs:code, ds:pmdata
public      power_management
,power_management_init,power_management_enable
public      pm_timer_hook,pm_kbd_hook
public      pm_enter_sleep, read_com, write com
public      write_crt_reg, read_crt_reg
public      suspend, resume
extrn       data0p:word
extrn       get_pm_ds:near
extrn       alloc_pm_ds:near
extrn       default_low_battery_alarm:near
extrn       rd_rtcw:near
extrn       wr_rtcw:near
extrn       rd_rtcb:near
extrn       wr_rtcb:near
extrn       play_song:near
extrn       set_ibm_timer:near
extrn       checksum:near
```

TABLE 1-continued

```
extrn    oem_pm_init:near
extrn    oem_pm_get_status:near
extrn    oem_pm_extensions:near
extrn    oem_pm_halt:near
extrn    oem_pm_activity?:near
extrn    oem_pm_reset_activity:near
extrn    oem_pm_toggle_led:near
extrn    oem_pm_turn_on_peripherals:near
extrn    oem_pm_turn_off_peripherals:near
extrn    oem_pm_power_off:near
extrn    oem_pm_suspend:near
extrn    oem_pm_blank_video:near
extrn    oem_pm_restore_video:near
extrn    oem_pm_save_peripherals:near
extrn    oem_pm_restore_peripherals:near
extrn    oem_pm_save_video_state:near
extrn    oem_pm_restore_video_state:near
extrn    oem_pm_kbd activity?:near
extrn    oem_pm_reset_kbd_activity:near
extrn    oem_pm_make_power_off_noise:near
extrn    oem_pm_make_low_battery_noise:near
extrn    oem_pm_defaults:near
extrn    oem_pm_get_hw:near
extrn    oem_pm_get_nmi_handler:near
es_arg   equ   word ptr [bp+16]
ah_arg   equ   byte ptr [bp+15]
al_arg   equ   byte ptr [bp+14]
ax_arg   equ   word ptr [bp+14]
cx_arg   equ   word ptr [bp+12]
cl_arg   equ   byte ptr [bp+12]
ch_arg   equ   byte ptr [bp+13]
dx_arg   equ   word ptr [bp+10]
dl_arg   equ   byte ptr [bp+10]
dh_arg   equ   byte ptr [bp+11]
bh_arg   equ   byte ptr [bp+09]
bl_arg   equ   byte ptr [bp+08]
bx_arg   equ   word ptr [bp+08]
bp_arg   equ   word ptr [bp+04]
si_arg   equ   word ptr [bp+02]
di_arg   equ   word ptr [bp+00]
page
pwrmgt_fx_table    label word
    dw    pm_get_profile              ;get current profile
    dw    pm_get_rtc_profile          ;get profile in rtc
    dw    pm_set_profile              ;set active profile
    dw    pm_set_rtc_profile          ;update rtc profile
    dw    pm_event_handler            ;install evt handler
    dw    pm_one_shot_event_handler   ;install evt handler
    dw    pm_get_pm_status            ;get status
    dw    pm_enter_sleep              ;enter sleep
    dw    oem_m_power_off             ;power off
    dw    oem_m_suspend               ;suspend
pwrmgt_fx_table_len   equ ($-pwrmgt_fx_table)/2
;==================================================
:   power_management_init
;==================================================
;
;   Called to initialize the Data Structures for
;   the power management kernel.  Alocate a Data Segment
;   initialize variables, install the default
;   Low Battery event handler, and call oem_pm_defaults
;   to setup any system specific hardware or default
;   settings.  Does not enable the power management yet . . .
power_management_init proc
    dbMESSAGE fTEST8+fTESTb <power_management_init>
    call   alloc_pm_ds                ;now sets ds . . .
    sub    ax, ax
    mov    pm_flags, al
    mov    second_counter, 18
    mov    minute_counter, 60         ;init this stuff . . .
    mov    ax,(SYS_PWR_MGT shl 8) or GET_RTC_PWR_PROFILE
    int    TASKINT
    push   dx                         ;save power off timeout
    mov    ax,(SYS_PWR_MGT shl 8) or SET_PWR_PROFILE
    int    TASKINT
    mov    ah, CM_ALM_REP             ;get alarm repeat
    call   rd_rtcb
    mov    cl, al                     ;input param
    mov    ah, CM_DEF_ALM
```

TABLE 1-continued

```
        call    rd_rtcb
        mov     bl, al
        and     bx, LBE_LB1 or LBE_LB2          ;default event type . . .
        pop     dx                              ;restore pwr_off_timeout
        mov     ax,(SYS_PWR_MGT shl 8) or INSTALL_LP_EVT_HANDLER
        push    cs
        pop     es
        mov     di, offset default_low_battery_alarm
        int     TASKINT
        jmp     oem_pm_defaults
power_management_init endp
;========================================================
;   Start Power Management . . .
;========================================================
;
;   After Initial Power Up Self Tests are completed,
;   power management is enabled. Do not enable until
;   it is time to boot the system.
;
power_management_enable proc
        push    ds
        call    get_pm_ds       ;load ds pointer
        or      pm_flags, PM_ENABLED
        pop     ds
        ret
power_management_enable endp
;========================================================
;   Power Management dispatch routine
;========================================================
;
;   Programmatic interface to the Power Management Kernel.
;   used to read  /alter management parameters.
;
;   This function is installed as Int 15h (task management)
;   function 0CFh.
Power_Management proc near
        sti
        cmp     al, PM_OEM_FX                   ;extended function??
        jnz     @F                              ;no. . .
        jmp     oem_pm_extensions               ;do private functions
@@:     cmp     al,pwrmgt_fx_table_len
        jae     md_err                          ;not here
        push    ds
        push    es
        pusha
        mov     bp,sp                           ;stack addressing . . .
        call    get_pm_ds                       ;load ds pointer
        sub     ah,ah
        shl     ax,1
        mov     si,ax
        call    pwrmgt_fx_table[si]             ;execute the_function
        popa
        pop     es
        pop     ds
        retf    2                               ;return
md_err: mov     ah,86h                          ;fx err
        stc
        retf    2                               ;save flags
Power_Management endp
page
;========================================================
;   pm_get_profile
;========================================================
;
;   Return to caller the current active profile.
;   This may have been modified by Set profile calls.
;
pm_get_profile:
        dbMESSAGE fTEST8+fTESTb <pm_set_profile>
        mov     ax,on_power_status
        mov     si_arg, ax
        mov     ax, sleep_power_status
        mov     di_arg, ax
        mov     al,lb_def_event_type
        mov     bl_arg, al
        rriov   al,kbd_timeout
        mov     bh_arg, al
        mov     al,doze_timeout
        mov     cl_arg, al
```

TABLE 1-continued

```
        mov     al, sleep_timeout
        mov     ch_arg, al
        mov     ax,pwr_off_timeout
        mov     dx_arg, ax
        clc
        ret
;===================================================
;   pm_set_profile
;===================================================
;
;   Set the current active profile.
;   Alter the desired parameters. Do this by calling
;   get profile, and then changing just those parameters
;   and then calling set profile
pm_set_profile:
        dbMESSAGE fTEST8+fTESTb <pm_set_profile>
        mov     doze_timeout, cl
        mov     sleep_timeout, ch
        mov     lb_def_event_type, bl
        mov     kbd_timeout, bh
        mov     pwr_off_timeout, dx
        mov     pwr_off_count,0                  ;clear countdown
        mov     ax, si_arg
        mov     on_power_status, ax
        mov     ax, di_arg
        mov     sleep_power_status, ax
        mov     ax, si_arg
        call    oem_pm_turn_on_peripherals
        clc
        ret
page
;===================================================
;   pm_get_profile
;===================================================
;
;   Return to caller the current active profile.
;   This may have been modified by Set profile calls.
;
pm_get_profile:
        dbMESSAGE fTEST8+fTESTb <pm_get_profile>
        mov     ax,on_power_status
        mov     si_arg, ax
        mov     ax,sleep_power_status
        mov     di_arg, ax
        mov     al,lb_def_event_type
        mov     bl_arg, al
        mov     al,kbd_timeout
        mov     bh_arg, al
        mov     al,doze_timeout
        mov     cl_arg, al
        mov     al,sleep_timeout
        mov     ch_arg, al
        mov     ax,pwr_off_timeout
        mov     dx_arg, ax
        clc
        ret
;===================================================
;   pm_set_profile
;===================================================
;
;   Set the current active profile.
;   Alter the desired parameters.  Do this by calling
;   get profile, and then changing just those parameters
;   and then calling set profile
pm_set_profile:
        dbMESSAGE fTEST8+fTESTb <pm_set_profile>
        mov     doze_timeout, cl
        mov     sleep_timeout, ch
        mov     lb_def_event_type, bl
        mov     kbd_timeout, bh
        mov     pwr_off_timeout, dx
        mov     pwr_off_count,0                  ;clear countdown
        mov     ax, si_arg
        mov     on_power_status, ax
        mov     ax, di_arg
        mov     sleep_power_status, ax
        mov     ax, si_arg
        call    oem_pm_turn_on_peripherals
        clc
```

TABLE 1-continued

```
        ret
page
;======================================================
;   pm_get_rtc_profile
;======================================================
;   Read Back current prbfile stored in the NV-RAM.
;   This profile is the default active at power up
;
pm_get_rtc_profile
        dbMESSAGE fTEST8+fTESTb <pm_get_rtc_profile>
        mov     ah,CM_OPCW
        call    rd_rtcw
        inov    si_arg, bx
        mov     ah,CM_SPCW
        call    rd_rtcw
        mov     di_arg, bx
        mov     ah,CM_DOZE
        call    rd_rtcw
        mov     cx_arg, bx
        mov     ah,CM_ALM_REP
        call    rd_rtcw
        mov     dx_arg, bx
        mov     ah,CM_DEF_ALM
        call    rd_rtcw
        mov     bx_arg, bx
        clc
        ret
;======================================================
;   pm_set_rtc_profile
;======================================================
;
;   Set the current NV-RAM profile.
;   Alter the desired parameters.  Do this by calling
;   get rtc profile, and then changing just those parameters
;   and then calling set rtc profile
;   This profile will be active next hard reset . . .
pm_set_rtc_profile:
        dbMESSAGE fTEST8+fTESTb <pm_set_rtc_profile>
        mov     ah, CM_OPCW
        mov     bx, si_arg
        call    wr_rtcw
        mov     ah, CM_SPCW
        mov     bx, di_arg
        call    wr_rtcw
        mov     ah,CM_DOZE
        mov     bx, cx_arg
        call    wr_rtcw
        mov     ah,CM_ALM_REP
        mov     bx, dx_arg
        call    wr_rtcw
        mov     ah,CM_DEF_ALM
        mov     bx, bx_arg
        call    wr_rtcw
        clc
        ret
page
;======================================================
;   pm_event_handler
;======================================================
;
;   Install a Low_Battery Event Handler.
;   Specify the Event criteria, which dictates
;   under which conditions the Event Handler is called,
;   and specify a repeat rate for recurring conditions.
;   Also specify a power off/ Suspend timeout
;   after the detection of a Low, Low Battery condition
pm_event_handler:
        dbMESSAGE fTEST8+fTESTb <pm_event_handler>
        xchg    [lb_event_mask],bx
        mov     bx_arg, bx
        xchg    word ptr [lb_event_handler],di
        mov     di_arg, di
        mov     bx,es_arg
        xchg    word ptr [lb_event_handler+2],bx
        mov     es_arg, bx
        xchg    [lb_event_rep], cl
        mov     cl_arg, cl
        xchg    [pwr_off_timeout], dx
        mov     dx_arg, dx
```

TABLE 1-continued

```
        and     [pm_flags],not PM_LB_HANDLER
        mov     ax, word ptr [lb_event_handler]
        or      ax, word ptr [lb_event_handler+2]
        jz      @F
        or      [pm_flags],PM_LB_HANDLER
@@:     mov     [lb_event_count], 0              ;time to do . . .
        clc
        ret
;======================================================
;   pm_one_shot_event_handler
;======================================================
;
;   Certain applications and/or management functions
;   may wish to be notified if a timebut period occurs
;   after a certain event.  This function provides
;   a 55 Msec resolution timing function for timing
;   events, and acts like a hardware one-shot; timing out
;   calling the one shot handler, and cancelling the
;   timer until it is reloaded again.
pm_one_shot_event_handler:
        dbMESSAGE fTEST8+fTESTb <pm_one_shot_handler>
        mov     word ptr [one_shot_handler],di
        mov     bx,es_arg
        mov     word ptr [one_shot_handler+2],bx
        mov     word ptr [one_shot_timer], cx
        mov     word ptr [one_shot_timer+2], dx
        mov     al, [pm_flags]                   ;get status
        or      cx, dx                           ;cancel??
        jz      os_cancel                        ;yes . . .
;====    Not a Cancel request1 so check if one shot is rolling
        test    al, PM_ONE_SHOT_HANDLER
        jnz     os_err
        and     al, not PM_ONE_SHOT_HANDLER
        mov     bx, word ptr [one_shot_handler]
        or      bx, word ptr [one_shot_handler+2]
        jz      @F
        or      al, PM_ONE_SHOT_HANDLER
@@      mov     [pm_flags], al
        clc
        ret
os_err: mov     ah_arg,86h                       ;already active
        stc
        ret
os_cancel:
        and     al, not PM_ONE_SHOT_HANDLER
        mov     [pm_flags], al
        clc
        ret
;======================================================
;   pm_get_m_status
;======================================================
;
;   Return the status of the System Status port.
;   this port has two defined bits:
;
;   bit 0 = Low Battery
;   bit 1 = Low, Low Battery
;
;   bit 0 = Low Battery
;   bit 1 = Low, Low Battery
;
;   Other bits have OEM specific meanings
pm_get_m_status:
        dbMESSAGE fTEST8+fTEST.b <pm_get_pm_status>
        call    oem_pm_get_status
        mov     bx arg, ax
        ret
;======================================================
;   pm_enter_sleep
;======================================================
;
;   This function sets up a sleep command at the
; next timer interrupt.
pm_enter_sleep:
        or      pm_flags, PM_SLEEP               ;say to sleep
        ret
assume  cs:code,ds:data0,es:pmdata
;======================================================
;   read_crt_reg
```

TABLE 1-continued

```
;===================================================
;
;   This routine is used to read the state of a
;   video register
;
;
;   inputs:    bl                            = address in 6845
;
;   outputs:   ax                            = word read
;===================================================
read_crt_reg proc near
        mov    dx,crt_addr
        mov    al,bl
        out    dx,al
        inc    dl
        in     al,dx
        mov    ch,al                         ;get msb
        dec    dl
        mov    al,bl                         ;set next addr
        inc    al
        out    dx,al
        inc    dl
        in     al,dx
        mov    ah,ch                         ;get lsb
        ret
read_crt_reg endp
;===================================================
;   read_com
;===================================================
;
;   This routine is used to read the status of a
;   8250 serial port and save it in memory
read_com    proc                             ;save com port in DX
        add    dl,lcr
        in     al,dx
        or     al,DLAB                       ;set dlab to read div reg
        jmp    $+2
        out    dx,al
        sub    dl,lcr
        in     ax,dx                         ;read divisor reg
        stosw
        add    dl,lcr
        in     al,dx
        and    al,not DLAB
        jmp    $+2
        out    dx,al
        sub    dl,lcr-ier
        mov    cx,6
rcom1:  in     al,dx
        inc    dx
        stosb
        loop   rcom1
        ret
read_com       endp
;===================================================
;   read_lpt
;===================================================
;
;   This routine is used to read the status of a
;   Industry Standard Parallel port and save it in memory
read_lpt    proc
        add  dl,printer_control
        in   al,dx
        stosb
        ret
read_lpt    endp
assume   cs:code,ds:pmdata,es:data0
;===================================================
;   write_com
;===================================================
;
;   This routine is used to restore the status of a
;   8250 serial port from where it was saved in memory
write_com proc
        add    dl,lcr
        in     al,dx
        or     al,DLAB
        jmp    $+2
        out    dx,al
```

TABLE 1-continued

```
        sub     dl,lcr
        lodsw
        out     dx,ax
        add     dl,lcr
        in      al,dx
        and     al,not DLAB
        jmp     $+2
        out     dx,al
        sub     dl,lcr-ier
        mov     cx,6
wcom1:  lodsb
        out     dx,al
        inc     dx
        loop    wcom1
        ret
write_com       endp
;==================================================
;   write_1pt
;==================================================
;
;  This routine is used to restore the status of a
;  Industry Standard Parallel port from
;  where it was saved in memory
write_1pt   proc
        add     dl,printer_control
        lodsb
        out     dx,al
        ret
write_1pt   endp
;==================================================
;   write crt register
;
;  This routine is used to restore the status of a
;  video register from memory
;
;  inputs:   cx      = word to write
;            bl      = address in 6845
;==================================================
write_crt_reg proc near
        mov     dx,crt_addr             ;set addr
        mov     al,bl
        out     dx,al
        mov     al,ch                   ;send msb
        inc     dl
        out     dx,al
        dec     dl
        mov     al,bl                   ;set next addr
        inc     al
        out     dx,al
        inc     dl
        mov     al,cl                   ;send lsb
        out     dx,al
        ret
write_crt_reg endp
assume  cs:code,ds:pmdata,es:nothing
page
;==================================================
;  pm_kbd_hook
;==================================================
;
;  In Software Based Power Management, this routine
;  is part of the Keyboard Interrupt chain. It is
;  used to detect keyboard activity.
;
;  Called every KBD INT: Set Keyboard Active bit
;
;  restore video if necessary
;
;  must save regs, take care of ints . . .
;
;
pm_kbd_hook:
        dbPC fTEST1+fTESTb "k"
        call get_pm_ds                          ;get ds
        test pm_flags, PM_VBLANK                ;video blanked out???
        jz   @F                                 ;NO
        call oem_pm_restore_video               ;turn on screen
        and  pm_flags, not PM_VBLANK            ;clear blank flag
@@:     or   pm_flags, PM_KBDACT                ;say keyboard had
```

TABLE 1-continued

```
activity
    ret
page
;================================================
;   pm_Timer_hook
;================================================
;
;   In Software Based Power Management, this routine
;   performs the function of the Timer and Dispatcher
;   It is part of the Timer Interrupt chain1 after
;   the timer end of interrupt (EOI) has been sent.
;
;   Checks for system activity and DOZES/ SLEEPs
;
;   Entry conditions:    cli, ds,es,pusha saved, ds=data0p
;   This routine contains two threads of code,
;   which execute independently.
;
;
;   COUNTER thread:
;   _____
;
;
;   The COUNTER thread checks for the one shot,
;   handles the second and minute counters, and looks
;   at the iow battery level, and dispatches the LB
;   event handler. It then looks at the DOZE flag,
;   and if doze is active, returns without changing
;   the activity status; so that the code after the DOZE
;   HLT can function.
;
;
;   DOZE thread:
;   _____
;
;
;   The DOZE thread runs when an activity check
;   shows no activity has been present for the
;   entire DOZE timeout. The processor clock
;   is slowed, the DOZE bit is set1 interrupts
;   are enabled, and the CPU is put into HLT.
;   When HLT is exited1 (18.2 hz) the activity
;   status is checked, to see if DOZE should be
;   terminated. If activity is present,
;   the DOZE flag is cleared and the
;   activity exit is taken.
;   If activity is not present, a test is made
;   for the SLEEP timeout. If the SLEEP timeout
;   has elapsed, SLEEP is entered, after saving
;   the peripheral state. Otherwise, the CPU
;   is halted, and the DOZE loop is reentered,
;   and the cycle continues until
;   terminated by ACTIVITY or SLEEP.
;
;================================================
        even                                    ;fast . . .
pm_timer_hook:
        cli                                     ;ints are off . . .
        call    get_pm_ds                       ;establish ds
        test    pm_flags, PM_ENABLED            ;running yet??
        jnz     @F
        jmp     exit_wo_change                  ;no . . .
@@:     call    oem_pm_get_hw                           ;get  hw_caps  to
ES:DI
        test    pm_flags, PM_ONE_SHOT_HANDLER   ;have one??
        jz      ck_sec                          ;no . . .
        dec     word ptr one_shot_timer
        sbb     word ptr one_shot_timer,0
        jnz     ck_sec
        and     pm_flags, not PM_ONE_SHOT_HANDLER   ;dont any more . . .
        call    one_shot_handler                ;called w/ ints disabled
;================================================
;   First, handle the one second dispatching
;================================================
        even
ck_sec:
        dec     second_counter
        jz      is_sec
        jmp     exit_wo_change
```

TABLE 1-continued

```
;===================================================
;   Second Rolled, Check Minutes
;===================================================
is_sec: mov   second_counter,18          ;ticks per second . . . reset
        dbPC  fTEST2+fTESTb "^Q"
        dec   minute_counter              ;count minutes . . .
        jz    @f
        jmp   not_minute
@@:     dbpC  fTEST2+fTESTb "("
page
;===================================================
;   All Code Below is executed once per Minute.
;   All Minute Counters are decremented here . . .
;===================================================
        mov   minute_counter, 60          ;reset
;===================================================
;   Count Down Sleep Timer
;===================================================
;   Turned On by Entering Doze . . .
        sub   ax, ax                      ;for resetting
        cmp   sleep_timeout,al            ;timeout used??
        jz    lb_dec                      ;NO
        mov   al, sleep_count             ;get sleep counter
        test  al,al
        jz    @F
        dec   al                          ;dec sleep counter
@@:     mov   sleep_count, al             ;reset
;===================================================
;   Count Down low battery event Timer
;===================================================
;
;   Rep count set by LB event detection
lb_dec:
        cmp   lb_event_rep,ah             ;timeout used??
        jz    kbd_dec                     ;NO
        mov   al, lb_event_count          ;dec event counter
        test  al, al                      ;already 0???
        jz    @F                          ;yes . . .
        dec   al                          ;dec rep counter
@@:     mov   lb_event_count, al          ;reset
;===================================================
;   Check For Keyboard Activity
;===================================================
        even
kbd_dec:
        test  es:[dij].HW_CAPS, HWC_KBACT
        jz    pwr_dec                     ;doesnt support KB activity
        call  oem_pm_kbd_activity?        ;kbd active??
        jnz   nokbact                     ;yes, normal
        dbPC  fTEST2+fTESTb "^Y"
;===================================================
;   Count Down Keyboard Timer
;===================================================
;
;   Turned On by No Kbd Activity . . .
        cmp   kbd_timeout,0               ;timeout used??
        jz    pwr_dec                     ;NO
        mov   all kbd_count               ;get blank counter
        test  al,al                       ;done . . .
        jz    pwr_dec
        dec   al                          ;dec sleep counter
        mov   kbd_count, al               ;reset to 0
        jnz   pwr_dec                     ;next counter
        or    pm_flags, PM_VBLANK         ;say its off . . .
        call  oem_pm_blank_video          ;blank the video
        jmp   short pwr_dec
nokbact:
        mov   al,kbd_timeout              reset counter
        mov   kbd_count, al
        call  oem_pm_reset_kbd_activity   ;clear activity bit
;===================================================
;   Count Down Power Off Timer
;===================================================
;
;   Turned On by LB2 detection below, and powers off
;   if hw supports it
;
        even
pwr_dec:
```

TABLE 1-continued

```
        test    es:[di].HW_CAPS, HWC_POWER
        jz      not_po                          ;doesnt support power off
        cmp     pwr_off_timeout,0               ;Countdown enabled??
        jz      not_po                          ;NO
        dec     pwr_off_count                   ;dec event counter
        jnz     not_po
        dbPC    fTEST2+fTESTb "p"
        call    oem_pm_power_off
not_po:
        dbPC    fTEST2+fTESTb ')'
page
;==================================================
;  All Code Below is execute once a Second
;==================================================
        even
not_minute:
;==================================================
;  Check and attend to the low battery indicators . . .
;==================================================
;
;  Once a Second, we check the Battery Levels via
;  polling. Since some hardware generates an NMI,
;  we inay not need to do this, Since the NMI will
;  be invoked at event time.
;
;  The Event Handler is assumed not to be re-entrant,
;  so it will not be re-entered until the first event
;  is handled. The next event will trigger as soon as
;  the PM_IN_LB_HANDLER flag is cleared.
;
;  Handler or no, the power off/Suspend Timeout is started
;  at Low, Low Battery detection.
        test    es:[di].HW_CAPS, HWC LB_NMI
        jnz     ck_led                          ;supports nmi, dont need this
        call    oem_pm_get_status               ;get this stuff
        and     ax, lb_event_mask               ;need to attend to??
        jz      ck_lb                           ;no . . .
        test    pm_flags, PM_LB_HANDLER         ;have one??
        jnz     ck_ilbh                         ;yes . . .
ck_lb:  mov     lb_event_count, 0               ;clear rep count for re-entry . . .
ck_lba: test    ax, LBE_LB2                     ;need to start power off??
        jz      ck_led                          ;no . . .
        jmp     short pwr_ct                    ;still count power off
ck_ilbh:
        dbPC    fTEST2+fTESTb "v"
        test    pm_flags, PM_IN_LB_HANDLER      ;Blocked??
        jnz     ck_lb2                          ;dont reenter
        cmp     ax, lb_last_event               ;same event as previously??
        jnz     ck_fevt
        cmp     lb_event_count,0                ;time to repeat??
        jnz     ck_lb2                          ;no . . .
        even
ck_fevt:
        mov     lb_last_event,ax                ;save event
        or      pm_flags, PM_IN_LB_HANDLER
        mov     bl,lb_def_event_type            ;default criteria
        push    ax
        call    lb_event_handler                ;do it, LB  flags in ax . . .
        pop     ax
        mov     bl, lb_event_rep                ;reset
        mov     lb_event_count, bl              ;event rep time
        and     pm_flags, not PM_IN_LB_HANDLER
;==================================================
;  Start power off timeout/suspend machine
;==================================================
ck_lb2: test    ax, LBE_LB2                     ;need to start power off??
        jz      ck_led                          ;no . . .
        cmp     pwr_off_count,0                 ;started previously??
        jnz     ck_led                          ;yes . . .
pwr_ct: mov     ax, pwr_off timeout             ;start event
        test    ax,ax                           ;immediate off/suspend???
        jnz     pwr_to                          ;no . . .
        test    es:[di].HW_CAPS, HWC_SUSPEND
        jz      ck_led                          ;doesnt support suspend
        dbPC    fTEST2+fTESTb "o"
```

TABLE 1-continued

```
        call    suspend                         ;suspend the machine . . .
        jmp     exit_w_activity                 ;yes, run now . . .
pwr_to: mov     pwr_off_count, ax               ;counter
;======================================================
;   Handle LED Flash Cycles
;======================================================
;
;   Some OEMs flash LEDs at different duty cycles to
;   indicate different operational conditions.
;
;   On/Off modulation is provided by this function.
;
;   LED flash cycles are handled
;   during the once per second loop
;
        even
ck_led:
        test    es:[di].HW_CAPS, HWC_LEDS
        jz      ck_activity                     ;doesnt support LEDs
        cmp     led_time_on, 0                  ;LED cycle active??
        jz      ck_activity                     ;no
        dec     led_next_event                  ;dec counter to next
delta
        jnz     ck_activity                     ;Non-zero, wait
;====   LED event time, toggle state, inc counters
        call    oem_pm_toggle_led
        mov     al, led_time_off                ;NO
        jz      ck_led2
        mov     ax, led_cycle_count             ;count infinite . . .
        test    ax, ax                          ;yes . . .
        jz      ck_led1
        dec     ax
        mov     led_cycle_count, ax             ;dec count every ON . . .
        jnz     ck_led1                         ;not timed out yet . . .
        mov     led_time_on, 0                  ;LED cycle NOT active
ck_led1:
        mov     al, led_time_on
ck_led2:
        mov     led_next_event, al              ;reset
;======================================================
;   Next, check if reentering from DOZE timer int
;======================================================
;
;   Thread detection logic:
;   we made it to here1 so lets see if we need to
;   exit to block again in DOZE, or to process a sleep
;   command, or perhaps enter doze.
;
;   If the DOZE flag is set, this means we entered the
;   timer hook from doze.  we should then exit without
;   resetting the activity monitor, and let the DOZE thread
;   see if something happened to run Full Clock speed.
;
;
;   If the DOZE flag is not set, check and see if No activity
;   has been present for the DOZE timeout, and enter DOZE if so.
;   Otherwise reset the activity monitor.
        even
ck_activity:
        test    pm_flags, PM_SLEEP              ;Req to sleep??
        jz      @F
        call    sleep                           ;yes . . .
        call    oem_pm_halt
        jmp     wake                            ;run . . .
@@:     test pm_flags, PM_DOZE                  ;Were WE dozing . . .
        jz      @F                              ;no
        jmp     exit_wo_change                  ;YES, exit to code below
;====   Next, check the activity Monitor =====
@@:     dbPC fTEST2+fTESTb "I"
        call    oem_pm_activity?                ;turns ints off . . .
        jnz     exit_w_activity                 ;yes, normal
        cmp     doze_timeout, 0                 ;doze allowed??
        jz      @F                              ;NO
        dec     doze_count                      ;timeout??
        jnz     @F
        jmp     go_doze
@@:     sti
        jmp     exit_wo_change
;======================================================
```

TABLE 1-continued

```
;   exits . . .
;=====================================================
;   Various exits to the COUNTER and DOZE threads . . .
;
;   Depending on Activity conditions
        even
exit_w_activity:
;===Exit, and reset the activity monitor
        sti
        mov     al, doze_timeout
        mov     doze_count, al
;===   Exit, and reset the activity monitor
exit_w_clear:
        dbPC    fTEST2+fTESTb "^p"
        call    oem_pm_reset_activity
exit_wo_change:
        ret
page
;=====================================================
;   go_doze
;=====================================================
;
;   At this point, we enter DOZE, having fulfilled the
;   criteria to enter that STATE
;
even
go_doze:
        mov     al, sleep_timeout               ;start sleep counter
        mov     sleep_count, al                 ;each time doze re-
entered
        or      pm_flags, PM_DOZE               ;in doze
        dbPC    fTEST2+fTESTb "d"
slow_cpu:
        call oem_pm_halt                        ;slow cpu, do halt
;====   When we start up here, the sleep_check will already
have
;   been run and taken the early return
        call    oem_pm_activity?
        jz      ck_sleep                        ;no, chk sleep
        and     pm_flags, not PM_DOZE           ;clear doze flag
        jmp     exit_w_activity                 ;yes, normal
;=====================================================
;   Decrement Sleep Counters . . .
;=====================================================
;
;   At this point, we enter check .the SLEEP counters
;   for criteria to enter that STATE. If not, reenter
the DOZE loop
;
ck_sleep:
        sub     al,al                           ;register zero
        cmp     sleep_timeout,al                ;sleep allowed.
        jz      slow_cpu                        ;NO
        cmp     sleep_count,al                  ;sleep time??
        jnz     slow_cpu                        ; no
        call    sleep                           ;enter sleep mode
        and     pm_flags, not PM_DOZE           ;clear doze flag
        jmp     exit_w_activity                 ;because we came out . . .
page
;=====================================================
;   Sleep
;=====================================================
;
;   At this point, we enter SLEEP, having fulfilled the
;   criteria to enter that STATE
;
;   Save, in order:
;   Video Adaptor state
;   LCD state
;   8250 modes
;   LPT modes
;   Timer Mask
;=====================================================
Sleep:
        dbPC    fTEST2+fTESTb "S"
        push    di
        push    si
        push    cx
        mov     di,offset sleep_save_buf
```

TABLE 1-continued

```
        cld
        and     pm_flags, not PM_SLEEP          ;starting sleep req
        assume  cs:code,ds:data0,es:pmdata
        push    ds
        pop     es
        mov     ds,data0p
;==================================================
;   save Display State
;==================================================
        call    oem_pm_save_video_state
;==================================================
;   save COM, LPT setups
;==================================================
        mov     dx, COM1                        ;get COM1
        call    read_com
        mov     dx, COM2                        ;get COM2
        call    read_com
        mov     dx, LPT1                        ;get LPT1
        call    read_lpt
        mov     dx, LPT2
        call    read_lpt
        mov     dx, LPT3
        call    read_lpt
        call    oem_pm_save_peripherals         ;for private stuff . . .
sleep_cpu
        in      al, PIC1                        ;get timer mask
        stosb   ;save
        or      al, TMRINT
        out     PIC1,al                         ;disable the timer interrupt
        assume  cs:code,ds:pmdata,es:data0
        push    es
        pop     ds
        mov     es,data0p                       ;swap ES/DS
        mov     ax,sleep_power_status           ;turns off stuff . . .
        call    oem_pm_turn_off_peripherals     ;actually turns off stuff. . .
        ret
page
wake:
;=====   Restore Peripheral Status=================
;
;  Because  we are here, this means   the wakeup key
;  was pressed,   or an external interrupt came in.
;  Time to wake up . . .
;
;
;  Restore, in order:
;  Video Adaptor state
;  8250 mode
;  LPT mode
;  Timer interrupt
;==================================================
        cli
        mov     ax,on_power_status              ;What to turn on . . .
        call    oem_pm_turn_on_peripherals      ;go do it
        mov     si,offset sleep_save_buf        ;start of save area
        cld
;==================================================
;   Restore Display State
;==================================================
        call oem_pm_restore_video_state
;==================================================
;   restore COM and PRN
;==================================================
        mov     dx,COM1                         ;get com port
        call    write_com
        mov     dx,COM2                         ;get com port
        call    write_com
        mov     dx,LPT1                         ;restore lpt port
        call    write_lpt
        mov     dx,LPT2                         ;restore lpt port
        call    write_lpt
        mov     dx,LPT3                         ;restore lpt port
        call    write_lpt
        call    oem_pm_restore_peripherals      ;for private stuff . . .
        push    ds
        call    set_ibm_timer                   ;restore ticks . . .
        pop     ds
        lodsb
```

TABLE 1-continued

```
        out     PIC1,al                         ; reenable interrupts
        pop     cx
        pop     si
        pop     di
        dbPC    fTEST2+fTESTb "G"
        ret
page
;===================================================
;   suspend
;===================================================
;
;   Swap stacks, to
;
;
assume  cs:code,es:data0,ds:pmdata
suspend proc
                                ;======   Save User Stack =====
        cli
        mov     ax,ss
        mov     pm_save_ss, ax  ;save stack
        mov     ax,sp
        mov     pm_save_sp, ax
        sti
;======   Run On Resume Stack=====
        mov     ax, ds
        mov     ss, ax                          ;setup resume stack
        mov     sp, offset pm_resume stack
        mov     es,data0p
        mov     reset_flag, FRESTORE
        call    checksum                        ;check this memory
        mov     pm_ram_chksum, ax               ;save in pm_datat
        call    sleep                           ;save it all . . .
        call    oem_pm_suspend                  ;do . . .
;===================================================
;   pm_resume
;===================================================
;
;   Cold Boot code jmps here   with BP as no resume
;   return address . . .
;
;   check for a valid resume, do so
;
;   otherwise, jmp bp to cold boot code
resume:
        mov     es,data0p
        cmp     reset_flag, FRESTORE
        jnz     resume_err
;=====   PM data should still be valid =====
        call    get_pm_ds ;get datasg
        mov     ax, ds
        mov     ss, ax                          ;setup resume stack
        mov     sp, offset pm_resume_stack
        call    checksum
        cmp     ax, pm_ram_chksum
        jnz     resume_err
        call    wake                            ;restore devices . . .
;=====   Restore User Stack =========
        mov     ax, pm_save_ss
        mov     Ss, ax
        mov     sp, pm_save_sp
        ret                                     ;to suspend caller
resume_err:
        jmp     bp                              ;return to do a hard
reset
suspend endp
code    ends
        end
```

TABLE 2

Program Listing
    A computer program embodiment of the software monitor for the power management unit appears in the following TABLE 2.

```
;=========================================================== ;
;         Do power management functions of int 16h and int 8h
;
;         Copyright - 1990 Vadem, Inc.
;
;         All Rights Reserved.
;
;                   C:
;=========================================================== ;
code            segment  public   'code'
       assume   cs:code
       org      100h
start:
       jmp      init
       even
pp_addr         dw    0378h
old_i8          label dword
i8_off          dw    0
i8_seg          dw    0ffffh
old_i10 label         dword
i10_off         dw    0      ; vector to old i10
i10_seg         dw    0ffffh
old_i16         label dword
i16_off         dw    0      ; vector to old i16
i16_seg         dw    0ffffh
sctr            db    0      ; counter for timeouts
two_ctr         dw    12*182 ; 2 minute counter
; - - - - Interrupt 10h handler
new_i10:
       call     busy_check
       jmp      old_i10
; - - - - Interrupt 8 handler
new_i8:
       call     busy_check
       jmp      old_i8
busy_check:
       cmp      sctr,0             ; already in faxt mode?
       jz       i8fast_mode
       sub      sctr,50
       jz       i8fast_mode
       jnc      i8z
       mov      sctr,0
; - - - - Switch to turbo mode here!
i8fast_mode:
       cmp      two_ctr,0          ; if timed out, do nothing
       jz       i8z                ; let IO monitor take over
; - - - Two minutes have not gone by, turn it to ON! - - - -
       dec      two_ctr
       push     dx
       push     ax
       mov      dx,0178h
       mov      al,0c0h
       out      dx,al
       inc      dx
       in       al,dx              ; get status of chip
       mov      ah,al
       and      al,3               ; LSB 2 bits
       jz       i8q                ; if not ON, nothing to do!
       dec      dx
       mov      al,0c0h
       out      dx,al
       inc      dx
       mov      al,ah
       and      al,not 3           ; set to ON mode
       out      dx,al
i8q:
       pop      ax
       pop      dx
i8z:
       ret
; - - - - Interrupt 16 interceptor
new_i16:
; - - - - Time to switch from ON to DOSE mode? - - - -
       push     ax
       push     dx
       mov      dx,0178h
```

TABLE 2-continued

```
       mov      al,0c0h
       out      dx,al
       inc      dx
       in       al,dx              ; get status of chip
       mov      ah,al
       and      al,3               ; LSB 2bits
       jnz      i16_dose           ; if not ON, nothing to do!
; - - - - Check to see if time to go into DOSE . . .
       add      sctr,24
       jnc      i16q
; - - - - Time to go into DOZE!
       dec      dx
       mov      al,0c0h
       out      dx,al
       inc      dx
       mov      al,ah
       or       al,1               ; set to dose mode
       out      dx,al              ; we are now in DOSE mode!
       jmp      short i16setctrs
; - - - We are already in DOSE mode, count faster!
i16_dose:
       add      sctr,200
       jnc      i16q
i16setctrs:
       mov      sctr,0ffh          ; clamp it
       mov      two_ctr,12 * 182   ; 18.2 Hz * 120 seconds
i16q:
       pop      dx
       pop      ax
       jmp      old_i16            ; do the original i16
init_str        db   'Power management controller version 1.00.$'
       assume   ds:code
init:
       mov      dx,offset init_str
       mov      ah, 9
       int      21h
       mov      ax,3508h
       int      21h
       mov      i8_seg,es
       mov      i8_off,bx
       push     ds
       pop      es
       mov      dx,offset new_i8
       mov      ax,2508h
       int      21h
       mov      ax,3510h
       int      21h
       mov      i10_seg,es
       mov      i10_off,bx
       push     ds
       pop      es
       mov      dx,offset new_i10
       mov      ax,2510h
       int      21h
       mov      ax,3516h
       int      21h
       mov      i16_seg,es
       mov      i16_off,bx
       push     ds
       pop      es
       mov      dx,offset new_i16
       mov      ax,2516h
       int      21h
       mov      dx,offset init_str+15
       mov      cl,4
       shr      dx,cl
       mov      ax,3100h
       int      21h
code            ends
       end      start
```

While the invention has been particularly shown and described with reference to preferred embodiments thereof, it will be understood by those skilled in the art that the foregoing and other changes in form and details may-be made therein without departing from the spirit and scope of the invention.

What is claimed is:

1. In a computer system comprising as hardware a plurality of system resources including a central processing unit (CPU), a memory device, and an input/output device, and as software, an operating system for managing and controlling said system resources, said system being operable in any one of at least three operating modes including a first-mode having a first power consumption level, a second-mode having a second power consumption level less than said first power consumption level, and a third-mode having a third power consumption level less than said second power consumption level; a method for controlling the operating mode of said computer system comprising:

while operating in said first mode, monitoring said computer to detect execution of a predefined code thread, and generating a first-mode to second-mode transition command signal in response to said detecting execution of a predefined code thread; and changing said operating mode from said first-mode to said second-mode in response to said first-mode to second-mode transition command signal; and while operating in said second mode, monitoring said computer to detect occurrence or non-occurrence of a second predefined event, and generating a second-mode to third-mode transition command signal in response to said second event detection; and changing said operating mode from said second-mode to said third-mode in response to said second-mode to third-mode transition command signal;

said first operating mode characterized by maintaining clocking of said CPU at a first frequency;

said second operating mode characterized by clocking said CPU at a second frequency less than said first frequency or by not maintaining clocking of said CPU; and said third operating mode characterized by maintaining operation only of said memory to preserve the integrity of data stored therein.

2. The method in claim 1, wherein said predefined code thread comprises an idle thread.

3. The method in claim 2, wherein said second predefined event comprises occurrence of a timer timeout condition a predetermined period of time after initiation of execution of said first idle thread.

4. The method in claim 2, wherein said second predefined event comprises occurrence of a predetermined timer timeout condition.

5. The method in claim 4, wherein said step of turning off at least one device comprises turning off clock to all devices except said memory.

6. The method in claim 1, wherein said execution of a predefined code thread comprises execution of a predefined code segment.

7. The method in claim 6, wherein said predefined code segment comprises an operating system call.

8. The method in claim 7, wherein said operating system call is an interrupt.

9. The method in claim 8, wherein said operating system is selected from the group consisting of a multi-tasking operating system, Microsoft Windows, Microsoft DOS, and combinations thereof.

10. The method in claim 8, wherein said interrupt comprises an idle state interrupt.

11. The method in claim 10, wherein said idle state interrupt is selected from the group consisting of DOS Idle Handler (Interrupt 28h), and DOS Idle Call (Interrupt 2Fh Function 1680).

12. The method in claim 8, wherein said interrupt comprises an idle handler.

13. The method in claim 12, wherein said idle handler enables background operations while the system waits for input.

14. The method in claim 12, wherein said idle handler is a operating system idle handler.

15. The method in claim 14, wherein said operating system idle handler comprises DOS Interrupt 28h.

16. The method in claim 14, wherein said operating system idle handler comprises DOS Multiplex Interrupt (Interrupt 2Fh).

17. The method in claim 14, wherein said operating system idle handler comprises DOS Idle Call (Interrupt 2Fh Function 1680).

18. The method in claim 12, wherein said idle handler comprises execution of an idle thread, and wherein execution of said idle thread communicates to other processes in said computer that the computer system is idle.

19. The method in claim 8, wherein said operating system call is an operating system multiplex interrupt and is used to monitor inter-process communications to identify idle class calls.

20. The method in claim 8, wherein said operating system call is an operating system multiplex interrupt and is used to monitor inter-process communications to identify operating system start-up and shut-down.

21. The method in claim 7, wherein said operating system call informs the system that the operating system is idle.

22. The method in claim 7, wherein said CPU is executing a plurality of threads and wherein each of said threads is in an idle state.

23. The method in claim 22, wherein said threads have an idle class priority such that they do not execute unless there are no threads having higher execution priority than said idle class priority.

24. The method in claim 22, wherein a keystroke check loop has an idle priority and is an indication of system idle.

25. The method in claim 22, wherein herein said thread is any thread that gives an indication that the system is at idle.

26. The method in claim 25, wherein said CPU generated command is selected from the group consisting of a system halt command, a system suspend command, and a system hibernate command.

27. The method in claim 25, wherein said CPU generated command is generated whenever an idle thread has been executing for more than a predetermined period of time.

28. The method in claim 1, wherein said first-mode to second-mode transition command slows or stops clocking of the CPU; and wherein said second-mode to third-mode transition command signal slows or stops clocking of other of said system devices and resources with the proviso that inputs required for maintenance of data stored in said memory are maintained.

29. The method in claim 1, wherein said second predetermined event comprises the occurrence of a second timer timeout.

30. The method in claim 1, further comprising the steps of:

while operating in said third mode, monitoring said computer to detect occurrence or non-occurrence of a third predefined event, and generating a third-mode to first-mode transition command signal in response to said third event detection; and changing said operating mode from said third-mode to said first-mode in response to said third-mode to first-mode transition command signal.

31. The method in claim 30, wherein said third event is selected from the group consisting of occurrence of a keyboard input, modem ring indicator, real time clock alarm, external pushbutton, and any predetermined interrupt.

32. The method in claim 30, wherein said second predefined event is an event selected from the set consisting of a timeout event, a CPU command event, and a statistical evaluation event; and wherein said third event is selected from the group consisting of occurrence of a keyboard input, modem ring indicator, real time clock alarm, external pushbutton, and any predetermined interrupt.

33. The method in claim 30, further comprising the steps of:

while operating in said second mode, monitoring said computer to detect occurrence or non-occurrence of a fourth predefined event, and generating a second-mode to first-mode transition command signal in response to said fourth event detection; and changing said operating mode from said second-mode to said first-mode in response to said second-mode to first-mode transition command signal.

34. The method in claim 33, wherein said fourth event is selected from the group consisting of a direct memory access (DMA), occurrence of a keyboard input, modem ring indicator, real time clock alarm, external pushbutton, any CPU initiated activity, any predetermined interrupt, and the occurrence of a predetermined address on a system bus.

35. The method in claim 30, wherein said second predefined event is an event selected from the set consisting of a timeout event, a CPU command event, and a statistical evaluation event; and wherein said third event is selected from the group consisting of an occurrence of a keyboard input, modem ring indicator, real time clock alarm, external pushbutton, and any predetermined interrupt; and wherein said fourth event is selected from the group consisting of a direct memory access (DMA), occurrence of a keyboard input, modem ring indicator, real time clock alarm, external pushbutton, any CPU initiated activity, any predetermined interrupt, and the occurrence of a predetermined address on a system bus.

36. The method in claim 1, wherein said second predefined event is an event selected from the set consisting of a timeout event, a CPU command event, and a statistical evaluation event.

37. The method in claim 1, further comprising the step of directly commanding said system to any of said first-mode, second-mode, or third mode by a CPU command.

38. In a computer system comprising as hardware a plurality of system resources including a central processing unit (CPU), a memory device, and an input/output device, and as software, an operating system for managing and controlling said system resources, said system being operable in any one of at least three operating modes including a first-mode having a first power consumption level, a second-mode having a second power consumption level less than said first power consumption level, and a third-mode having a third power consumption level less than said second power consumption level; a method for controlling the operating mode of said computer system comprising:

while operating in said first mode, monitoring said computer to detect exceeding a threshold value for a statistical evaluation of active and idle process, and generating a first-mode to second-mode transition command signal in response to said detecting exceeding a threshold value for a statistical evaluation of active and idle process; and changing said operating mode from said first-mode to said second-mode in response to said first-mode to second-mode transition command signal; and while operating in said second mode, monitoring said computer to detect occurrence or non-occurrence of a second predefined event, and generating a second-mode to third-mode transition command signal in response to said second event detection; and changing said operating mode from said second-mode to said third-mode in response to said second-mode to third-mode transition command signal;

said first operating mode characterized by maintaining clocking of said CPU at a first frequency;

said second operating mode characterized by clocking said CPU at a second frequency less than said first frequency or by not maintaining clocking of said CPU; and said third operating mode characterized by maintaining operation only of said memory to preserve the integrity of data stored therein.

39. The method as in claim 38, wherein said idle process makes at least one function call.

40. The method as in claim 38, wherein said idle process is comprised of threads.

41. The method in claim 38, wherein said statistical evaluation comprises statistical evaluation of active and idle function calls.

42. In a computer system comprising as hardware a plurality of system resources including a central processing unit (CPU), a memory device, and an input/output device, and as software, an operating system for managing and controlling the system resources, at least one of said system devices and resources being operable in any one of three operating modes including a first-mode having a first power consumption level, a second-mode having a second power consumption level less than said first power consumption level, and a third-mode having a third power consumption level less than said second power consumption level; a method for controlling the operating mode of the computer system comprising the steps of:

while operating in said first mode, monitoring said computer to detect completion of execution of all idle threads executing on said system, and generating a slow or stop processor clock command in response to said idle thread completion detection;

while operating in said second mode wherein said CPU clock is slowed or stopped, receiving an interrupt from a timer circuit indicating occurrence of a predetermined timer time-out condition, and generating a slow or stop device command to slow or turn off clock signal to at least one of said devices in response to occurrence of said timeout condition;

said first operating mode characterized by maintaining clocking of said CPU at a first clock frequency;

said second operating mode characterized by clocking said CPU at a second clock frequency less than said first frequency or by not maintaining clocking of said CPU; and said third operating mode characterized by maintaining operation of said memory to preserve the integrity of memory contents stored therein.

43. The method in claim 42, further comprising the steps of:

while operating in said third mode, monitoring said computer to detect occurrence or non-occurrence of a third predefined event, and generating a third-mode to first-mode transition command signal in response to said third event detection; and changing said operating mode from said third-mode to said first-mode in response to said third-mode to first-mode transition command signal.

44. The method in claim 43, wherein said third event is selected from the group consisting of occurrence of a keyboard input, modem ring indicator, real time clock alarm, external pushbutton, and a predetermined hardware interrupt.

45. The method in claim 43, further comprising the steps of:

while operating in said second mode, monitoring said computer to detect occurrence or non-occurrence of a fourth predefined event, and generating a second-mode to first-mode transition command signal in response to said fourth event detection; and changing said operating mode from said second-mode to said first-mode in response to said second-mode to first-mode transition command signal.

46. The method in claim 45, wherein said fourth event is selected from the group consisting of a direct memory access (DMA), occurrence of a keyboard input, modem ring indicator, real time clock alarm, external pushbutton, any CPU initiated activity, any predetermined interrupt, and the occurrence of a predetermined address on a system bus.

47. The method in claim 42, wherein said first predefined event is an event selected from the set consisting of a timeout event, a CPU command event, and a statistical evaluation event; and wherein said second predefined event is an event selected from the set consisting of a timeout event, a CPU command event, and a statistical evaluation event; and wherein said third event is selected from the group consisting of an occurrence of a keyboard input, modem ring indicator, real time clock alarm, external pushbutton, and any predetermined interrupt; and wherein said fourth event is selected from the group consisting of a direct memory access (DMA), occurrence of a keyboard input, modem ring indicator, real time clock alarm, external pushbutton, any CPU initiated activity, any predetermined interrupt, and the occurrence of a predetermined address on a system bus.

48. A computer system including as hardware a plurality of system resources including a processing unit responsive to a processor clock signal, a memory device, and an input/output device, and an operating system for controlling operation of said computer system, at least one of said system devices and resources being operable in any one of at least three operating modes including a first-mode having a first power consumption level, a second-mode having a second power consumption level less than said first power consumption level, and a third-mode having a third power consumption level less than said second power consumption level; said computer system characterized in that said computer system further comprises:

idle thread execution completion detection means for monitoring said computer system to detect completion of execution of all idle threads executing on said system while operating in said first mode;

processor clock speed control means for slowing or stopping said processor clock signal in response to said idle thread execution completion detection;

a timer circuit generating a timer-timeout signal indicating occurrence of a predetermined timer time-out condition;

a device controller receiving said timer-timeout signal while operating in said second mode wherein said processor clock is slowed or stopped and generating a slow or stop device signal to slow or turn off clock signal to at least one of said devices in response to occurrence of said timer timeout condition;

said first operating mode characterized by maintaining clocking of said processor at a first clock frequency; said second operating mode characterized by clocking said processor at a second clock frequency less than said first frequency or by not maintaining clocking of said processor; and said third operating mode characterized by maintaining operation of said memory to preserve the integrity of memory contents stored therein.

* * * * *